US012116169B2

(12) United States Patent
Coscia

(10) Patent No.: US 12,116,169 B2
(45) Date of Patent: Oct. 15, 2024

(54) APPARATUS AND METHOD FOR ASEPTICALLY TRANSFERRING FLUIDS FROM A FLUID CONTAINER

(71) Applicant: ENTEGRIS, INC., Billerica, MA (US)

(72) Inventor: Nicholas Coscia, Lexington, MA (US)

(73) Assignee: ENTEGRIS, INC., Billerica, MA (US)

(*) Notice: Subject to any disclaimer, the term of this patent is extended or adjusted under 35 U.S.C. 154(b) by 89 days.

(21) Appl. No.: 18/100,493

(22) Filed: Jan. 23, 2023

(65) Prior Publication Data

US 2023/0234823 A1 Jul. 27, 2023

Related U.S. Application Data

(60) Provisional application No. 63/303,016, filed on Jan. 25, 2022.

(51) Int. Cl.

| | |
|---|---|
| ***B65D 47/06*** | (2006.01) |
| ***B65D 25/48*** | (2006.01) |
| ***B65D 47/24*** | (2006.01) |
| ***B67C 3/04*** | (2006.01) |
| *B65D 47/32* | (2006.01) |

(52) U.S. Cl.

CPC ........... *B65D 25/48* (2013.01); *B65D 47/061* (2013.01); *B65D 47/248* (2013.01); *B67C 3/04* (2013.01); *B65D 47/32* (2013.01)

(58) Field of Classification Search

CPC ........ B65D 25/48; B65D 47/04; B65D 47/06; B65D 47/061; B65D 47/248; B65D 47/32; B65D 2401/15; B67C 3/04

See application file for complete search history.

(56) References Cited

U.S. PATENT DOCUMENTS

| | | | | |
|---|---|---|---|---|
| 6,669,062 | B1 * | 12/2003 | Laible | B67D 7/0294 251/149.6 |
| 8,398,585 | B2 * | 3/2013 | Matusch | A61J 1/2096 604/82 |
| 8,545,441 | B2 * | 10/2013 | Matusch | A61M 5/2066 141/330 |
| 9,458,003 | B1 * | 10/2016 | Laible | B67D 7/0266 |
| 9,963,279 | B2 * | 5/2018 | Huber | B67D 3/0051 |
| 11,220,379 | B2 * | 1/2022 | Heinbuch | B67D 7/0294 |

(Continued)

FOREIGN PATENT DOCUMENTS

| | | |
|---|---|---|
| WO | 2020237007 A1 | 11/2020 |
| WO | 2021099479 A1 | 5/2021 |

*Primary Examiner* — Nicolas A Arnett

(57) ABSTRACT

An aseptic closure assembly for a fluid container that includes a cap connectable to an opening of the fluid container and a fluid dispenser connectable to an outer surface of the housing of the cap. The fluid dispenser includes a main body and fluid lines provided within the main body, a shell housing provided around the main body, and an insert connectable to a second end of the main body. The main body includes apertures nearer the second end that are connected to the fluid lines and configured to be in fluid communication with the fluid container when the fluid dispenser is connected to the cap. The fluid dispenser is configured such that a downward directed force towards the fluid container fits the insert into the support of the cavity and disconnects the insert from the main body of the fluid dispenser to seal the fluid container.

20 Claims, 13 Drawing Sheets

(56) References Cited

U.S. PATENT DOCUMENTS

| | | | | |
|---|---|---|---|---|
| 2012/0118431 | A1* | 5/2012 | Dickie | B65D 47/249 141/311 R |
| 2015/0368005 | A1* | 12/2015 | Wilkinson | B65D 25/48 222/1 |
| 2018/0339818 | A1* | 11/2018 | Matsumoto | B67D 7/005 |
| 2022/0119169 | A1* | 4/2022 | Heinbuch | B67D 7/0294 |
| 2023/0213129 | A1* | 7/2023 | Peabody | A61M 39/18 |

* cited by examiner

APPARATUS AND METHOD FOR ASEPTICALLY TRANSFERRING FLUIDS FROM A FLUID CONTAINER

PRIORITY

This disclosure claims priority to U.S. provisional application No. 63/303,016 with a filing date of Jan. 25, 2022 which is incorporated by reference herein.

FIELD

This disclosure relates generally to a system for aseptically transferring a fluid from a fluid container. More specifically, the disclosure relates to an aseptic closure assembly including a cap and fluid dispensing assembly, method, and components for aseptically transferring the fluid from the fluid container.

BACKGROUND

Chemical and/or biological processes can utilize or produce process materials that are stored within storage containers, such as, bioprocess bags, bottles, and the like having rigid connection systems, containing pharmaceutical or biological fluids, acids, solvents, bases, photoresists, dopants, inorganic solutions, organic solutions, or the like. The process materials may need to be frozen or otherwise kept at low temperatures within the storage container. In using such fluids, the storage container needs to properly contain the chemicals during storage, transport, and ultimately during the manufacturing process itself. Currently, the methods and fluid transfer assemblies for transferring fluids to or from the storage container having rigid connection systems, however, cannot guarantee the sterility of the system.

SUMMARY

This disclosure relates generally to a system for aseptically transferring a fluid from a fluid container. More specifically, the disclosure relates to an aseptic closure assembly including a cap and fluid dispensing assembly, method, and components for aseptically transferring the fluid from the fluid container.

In an embodiment, an aseptic closure assembly for a fluid container is provided. The aseptic closure assembly includes a cap connectable to an opening of the fluid container, the cap having a housing, a cavity within the housing having a support, and a first set of seals; and a fluid dispenser connectable to an outer surface of the housing of the cap. The fluid dispenser includes a main body having a first end and a second end and fluid lines provided within the main body between the first end and the second end, a shell housing provided around the main body, a second set of seals, and an insert connectable to the second end of the main body. The main body includes apertures nearer the second end that are connected to the fluid lines and configured to be in fluid communication with the fluid container when the fluid dispenser is connected to the cap. Additionally, the fluid dispenser is configured such that a downward directed force towards the fluid container fits the insert into the support of the cavity and disconnects the insert from the main body of the fluid dispenser to seal the fluid container.

In another embodiment of the invention, an aseptic closure assembly is provided that includes a cap connectable to an opening of the fluid container, the cap including a housing, a cavity within the housing, a port connected to the cavity, and a first set of seals. The port includes a port shell and an insert connected to one end of the port shell, in which the insert is configured to open and close a fluid communication channel between the fluid container and the port; and a fluid dispenser connectable to an outer surface of the port shell. The fluid dispenser includes a main body having a first end and a second end and a fluid line provided within the main body between the first end and the second end, a shell housing provided around the main body, a second set of seals, and an engagement piece that is engageable with the insert. The engagement piece of the fluid dispenser is engageable with the insert of the port by a rotational engagement such that the fluid line is able to be directed downwardly with the insert towards the fluid container to open the fluid communication channel with the fluid container.

In an embodiment, a method for aseptically transferring a fluid into and from a fluid container is provided. The method includes the steps of connecting a cap to an opening of the fluid container, the cap including a housing, a cavity within the housing, a port connected to the cavity, and a first set of seals. The port includes a port shell and an insert connected to one end of the port shell, in which the insert is configured to open and close a fluid communication channel between the fluid container and the port. The method further includes transferring fluid into the fluid container by aseptically connecting and disconnecting a fluid dispenser to an outer surface of the port shell, in which the fluid dispenser includes a main body having a first end and a second end and a fluid line provided within the main body between the first end and the second end, a shell housing provided around the main body, a second set of seals, and an engagement piece that is engageable with the insert. When the engagement piece of the fluid dispenser is engaged with the insert of the port by a rotational engagement, the fluid line is able to be directed downwardly with the insert towards the fluid container to open the fluid communication channel with the fluid container.

In yet another embodiment, a fluid dispenser connectable to an outer surface of a cap of a fluid container is provided. The fluid dispenser includes a main body having a first end and a second end, in which the main body includes a fluid line provided between the first end and the second end; and a shell housing provided around the main body. The fluid line at the second end of the main body is configured to be connectable with an insert provided in the cap by a rotation of the main body, in which the shell housing includes bellows that are compressible to allow the fluid line to be aseptically inserted into the fluid container.

DRAWINGS

Like numbers represent like features.

DETAILED DESCRIPTION

Figure 1:
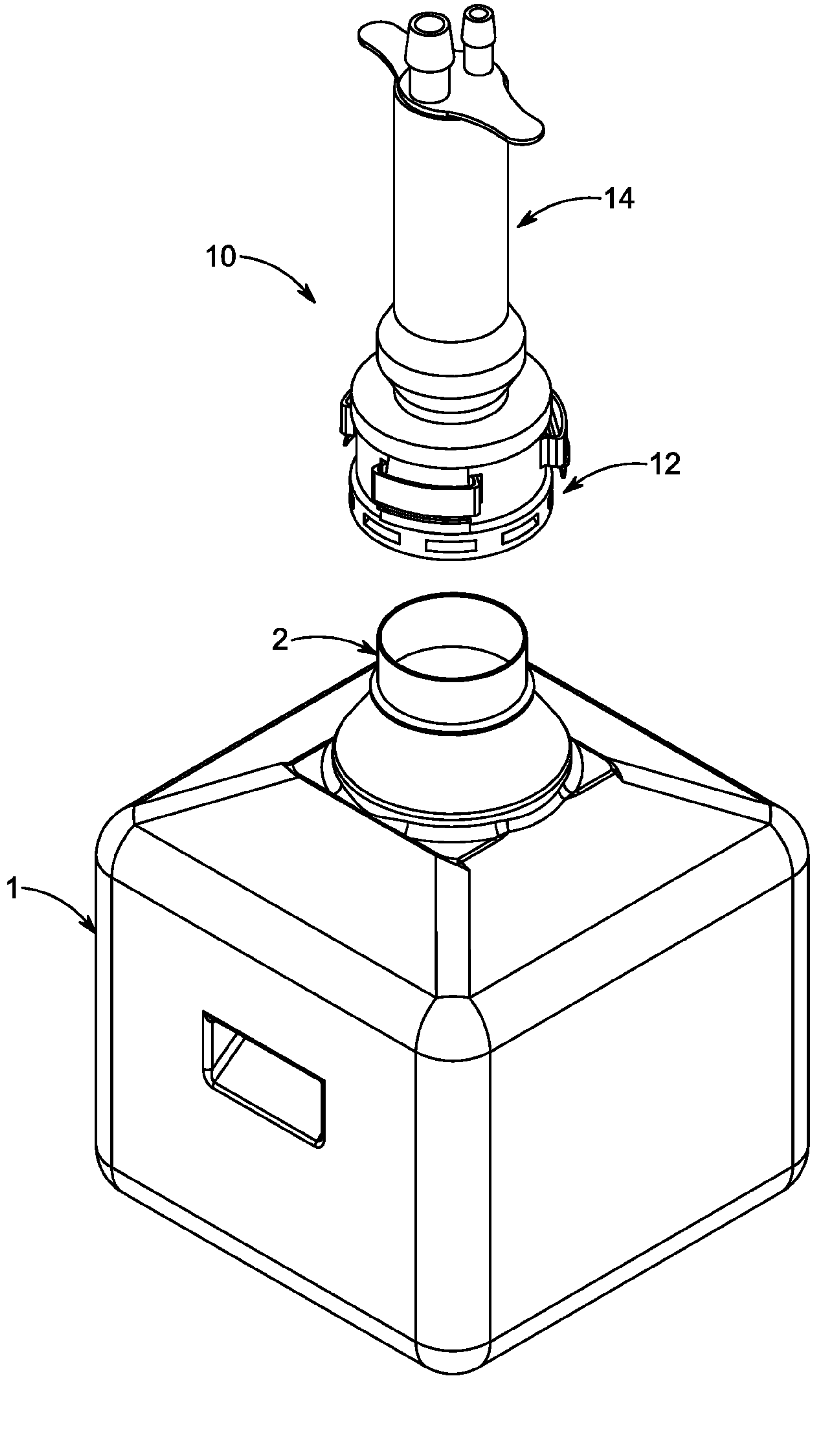
FIG. 1 is a schematic view of an aseptic closure assembly according to an embodiment.

This disclosure relates generally to an aseptic closure assembly for aseptically transferring a fluid from a fluid container. More specifically, the disclosure relates to an aseptic closure assembly that includes a cap and fluid dispensing assembly used to aseptically couple and transfer, e.g., filling and removing, of fluids from storage containers to avoid contamination. The term aseptic as used herein is at least related to creating a barrier or fluid path that remains unbroken between the fluid dispensing assembly and the fluid container to keep the fluid substantially free of contaminants from an external environment to maintain the sterility of the internal content and/or components. While the fluids related to chemical and/or biological processes are discussed below, it is appreciated that such discussion is not intended to limit the scope of the invention, but provided as embodiments thereof. A fluid includes, but is not limited to, a substance that flows or deforms when a shear stress is applied. A fluid can include, for example, a liquid.

For example, in the bioprocess market, customers perform freezing, shipping, and thawing of their drug products in a variety of fluid storage containers, such as, bottles, bags, pails, drums, or the like. While customers are able to transfer fluids to bag assemblies aseptically using a variety of aseptic connectors, the use of bottles, pails, drums, or larger bag assemblies is not as widely utilized since the transfer of fluids to or from the bottles, pails, drums, or larger bag assemblies cannot be made using a simple aseptic connection assembly, e.g., the transfer of fluid is not in a closed system and requires additional equipment or features for maintaining the sterility of the fluid, since a fluid transfer assembly is connected to the top of the bottle, pail, drum, or larger bag assembly. For example, customers may use bottles with caps on a top opening thereon that have tubing connection ports or have a polymer stopper covering the bottle top opening. While the caps can be used for aseptically filling the bottle and the polymer stopper can be used to close the bottle, in both instances, the customers are required to either remove the cap and replace it with a solid cap for the freezing, shipping, and thawing process steps or remove the polymer stopper to fill and/or remove the fluid, e.g., a drug product. The replacing of the bottle cap and/or the polymer stopper, however, opens the system and exposes the fluids in the bottle to the outside environment which can lead to possible contamination of the fluid. To limit and/or reduce the amount of contaminants that can enter the bottle during the replacing of the bottle cap and/or the polymer stopper, a hood can be used to attempt to maintain the sterility of the system. In order to simplify the filling and removing of the fluid from the bottle, e.g., not requiring the use of the hood or additional equipment to maintain sterility of the system, and to reduce the chances of contaminating the fluid in the bottle, a system is needed for aseptically transferring a fluid from the fluid storage container, such as a bottle, pail, drum, or the like.

Embodiments of the disclosure are directed to an aseptic closure assembly that includes a cap and fluid dispenser that allows the aseptic transfer of fluids from a fluid container, for example, a bottle or other fluid container having a rigid opening, e.g., a pail, bucket, or larger bag assembly having a rigid opening that is able to be fitted with the cap. It is appreciated that a rigid opening as used herein is at least directed to an opening that is formed on a fluid container made of a relatively rigid material, for example, from one or more polymers. For example, the fluid container can be made of polyethylene (PE), poly(ethylene terephthalate) (PET), poly(ethylene terepthate) glycol (PETG), polycyclohexylenedimethylene terephthalic acid (PCTA), polycyclohexylenedimethylene terephthalate glycol (PCTG), polycarbonate (PC), polypropylene (PP), poltamide (PA), polyethersulfone (PES), polyphenylsulfone (PPSU), poly (methyl methacrylate (PMMA), high impact polystyrene (HIPS), poly(ethylene napthalate) (PEN), poly(ether ether ketone) (PEEK), cyclic olefin polymers, cyclic olefin copolymers, fluorpolymer, or the like, and copolymers including those material.

The aseptic cap and fluid dispenser can include a multi-use aseptic cap that allows a user to aseptically connect and disconnect to a fluid storage container having a rigid opening, for example, a bottle or a rigid opening on a bag assembly, before and after freeze/thaw process steps. The aseptic closure assembly can allow users to fill the bottle before freezing and drain the bottle after thawing, without the need for replacing the caps and/or polymer stoppers during the filling and draining process, and avoids breaking of the sterile barrier and/or fluid path between the fluid dispenser and the fluid storage container. The aseptic cap and fluid dispenser allows the use of bottles as a closed system, e.g., prevents contamination of the fluid by being open to outside environments, to maintain the sterility of the fluid in the fluid handling system, and especially, for bioprocess fluid handling. It is appreciated that at least due to the design and structure of the aseptic closure assembly, the fluid storage container and aseptic closure assembly can be used in freeze/thaw process steps for down to −85° C. applications, in which there is currently no existing aseptic cap design that is rated for use in such conditions and especially for such top feed and removal devices. It is appreciated that while the description of the fluid storage container and aseptic closure assembly is discussed with respect to temperatures as low as −85° C., the fluid storage container and aseptic closure assembly can also be used at cryogenic temperatures, e.g., lower than −190° C. and even more preferably lower than −196° C.

FIG. 1 is a schematic view of an aseptic closure assembly 10 for a fluid container 1, according to an embodiment. The aseptic closure assembly 10 can include a cap 12 that is connectable to a top opening of the fluid container 1 and a fluid dispenser 14, in which the cap 12 and the fluid dispenser 14 are configured to couple together to form a sealed fluid connection. The fluid dispenser 14 includes a fluid passage that extends through the fluid dispenser 14 from an opening. The cap 12 is configured to aseptically connect the fluid passage of the fluid dispenser 14 to the fluid container 1 to provide an aseptic fluid communication when the fluid dispenser 14 is connected to the cap 12, as further discussed below.

Thus, the aseptic closure assembly 10 is configured to aseptically connect and disconnect from a fluid container for the aseptic transferring of fluids to or from a fluid container that can be used in temperatures as low as −85° C. It is appreciated that the aseptic closure assembly 10 can also be used at other temperatures, such as 0° C., room temperature, or the like, while maintaining the benefits of the present disclosure. Accordingly, the fluid container 1 having the aseptic closure assembly 10, as discussed above, is configured to be stored at frozen temperatures (e.g., temperatures of less than 0° C. and lower). In an embodiment, the fluid container 1 having the aseptic closure assembly 10 can also be heated back to ambient temperature without having any substantial deformation. Substantial deformation includes, for example, visible cracking in the material, a shrinkage or expansion relative to its original shape at ambient temperature that can interfere with the connection(s) or adversely affect sealing of said connection(s). Temperature retraction testing can be performed according to ASTM D1329, ISO 2921, or any other suitable testing methodology for determining suitable retraction properties of the material at temperatures that may be used. Brittleness testing can be performed according to ASTM D2137, ISO 28702, or any other suitable testing methodology for determining resistance to cracking at temperatures that may be used.

The fluid container 1 can generally be used for containing a fluid such as a liquid suitable for use in, for example, manufacturing and/or biological processes, such as, but not limited to, semiconductor manufacturing, pharmaceutical manufacturing, or biological processing, or the like. As such, it is appreciated that the fluid container 1 can store liquids including liquid chemicals such as, but not limited to, photoresists, acids, solvents, bases, dopants, inorganic solutions, organic solutions, pharmaceuticals, biological fluids, or the like.

In an embodiment, the fluid container 1 can be a plastic bottle and/or include a bag-in-bottle or can be a bag-in-can style container. In other embodiments, the fluid container 1 can be a bag assembly having a rigid connection structure, for example, boat fitments, fitments, plastic ports, or the like, or a combination of the above. It is appreciated that the container can be any type of container having a rigid opening 2 for attaching of the aseptic closure assembly 10, as discussed below. Such a fluid container 1 (or rigid connection structure) can be made of a relatively rigid material, for example, from one or more polymers. For example, the fluid container 1 can be made of polyethylene (PE), poly(ethylene terephthalate) (PET), poly(ethylene terepthate) glycol (PETG), polycyclohexylenedimethylene terephthalic acid (PCTA), polycyclohexylenedimethylene terephthalate glycol (PCTG), polycarbonate (PC), polypropylene (PP), poltamide (PA), polyethersulfone (PES), polyphenylsulfone (PPSU), poly(methyl methacrylate (PMMA), high impact polystyrene (HIPS), poly(ethylene napthalate) (PEN), poly(ether ether ketone) (PEEK), cyclic olefin polymers, cyclic olefin copolymers, or the like, and copolymers including those materials.

The cap 12 is connectable to the rigid opening 2 of the fluid container 1 to secure the cap 12 to the fluid container 1. The cap 12 can be connected to the fluid container 1 by press fitting the cap 12 to the rigid opening or the cap 12 and the rigid opening 2 can include mutually engaging threading. It is appreciated that the cap 12 can also be connected to the fluid container 1 in other manners, for example, using mechanical fasteners, such as, clamps, respective engagement features, or the like, or welding or bonding techniques, such as, heat bonding, impulse welding, laser welding, ultrasonic welding, or similar fusion bonding/melt welding techniques. In an embodiment, the cap 12 can be connected to the fluid container using a tamper evident connecting system. For example, the cap 12 having the tamper evident connection system can include inwardly biasing retaining arms that engage corresponding protrusions around the rigid opening 2 of the fluid container 1 once pressed to a predetermined position on the rigid opening 2 such that the cap 12 is not able to be easily removed from the fluid container 1 without leaving visible indications of damage to the cap 12 and/or the fluid container 1. In another embodiment, the cap 12 having the tamper evident connection system can include a protrusion at a lower portion of the threading, so that once the cap 12 is threaded to a predetermined position, the cap 12 is not able to be removed from the fluid container 12, e.g., by reversing the rotation of the cap 12 on the rigid opening 2. In yet another embodiment, the tamper evident connection system can include a ring on the cap 512, which separates from the cap 512, if the cap 512 is removed from the fluid container. Thus, the tamper evident connection system is able to alert a customer or user of the fluid container 1 having the cap 12 if the fluid container 1 has been opened, or attempted to be opened, and possibly contaminated and/or compromised.

Figure 2A:
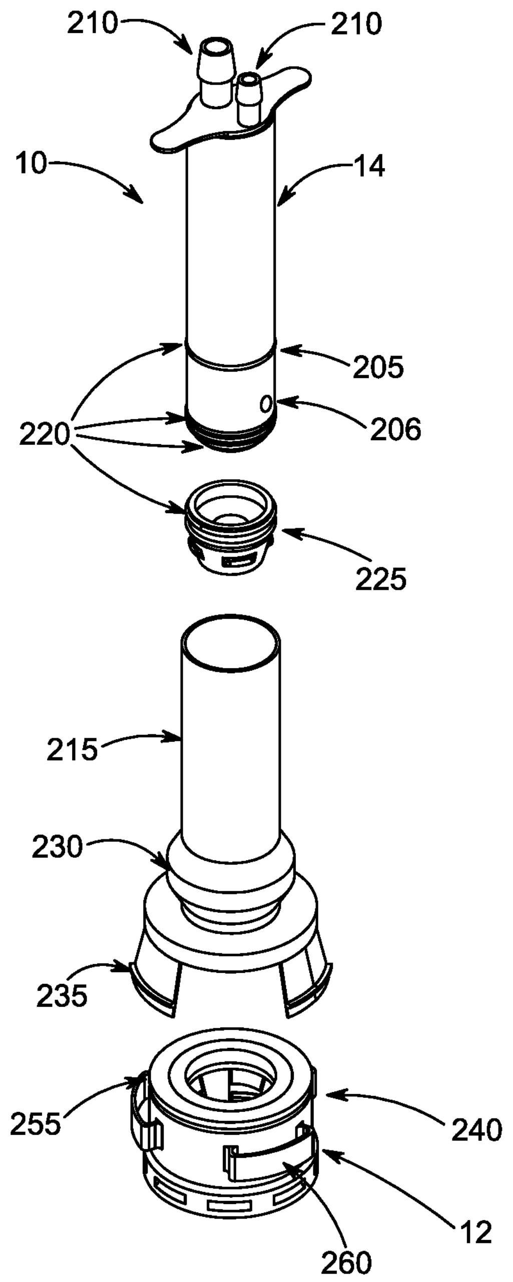
FIGS. 2A-2B are exploded and perspective views of a cap and fluid dispenser according to FIG. 1.
Figure 2B:
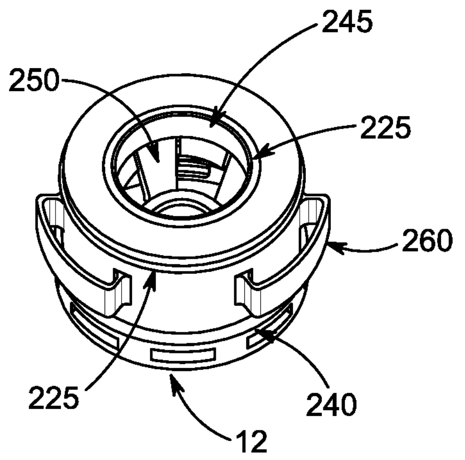

FIGS. 2A-2B show an embodiment of the aseptic closure assembly 10, as discussed above. As seen in FIG. 2A, the aseptic closure assembly 10 includes the cap 12 and the fluid dispenser 14. The fluid dispenser 14 includes a main body 205 having a first end and a second end, fluid lines 210 provided within the main body between the first end and the second end, a shell housing 215 provided around the main body 205, a set of seals 220, and an insert 225 connectable to and/or releasable from the second end of the main body 205. The insert 225 is connectable to and/or releasable from the second end of the main body 205 by being press fitted to the second end of the main body, for example, a seal 220 provided around the second end of the main body 205. It is appreciated that the insert 225 can also be connected to the main body 205 using various structures that allow the connecting and releasing of the insert 225. For example, in an embodiment, the second end of the main body 205 can include engaging portions or protrusions extending from the second end of the main body 205 that engage corresponding recesses provided in the insert 225. Thus, the engaging portions or protrusions of the second end of the main body 205 can be inserted and rotated within the recesses of the insert 225 for the connection and release of the insert 225 from the main body 205.

The fluid lines 210 nearer the first end of the main body 205 can include a tube connector for connecting to a fluid transfer system for the transfer, e.g., filling or removing, of the fluid with respect to the fluid container 1. The tube connector can be selected from the group consisting of a hose barb, an overmolded connection, a screw connection, a press-fit connection, a snap-fit connection, or a combination thereof. It is also appreciated that the tube connector can be continuously formed with the fluid transfer system, for example, by molding or overmolding the fluid dispenser 14 with the fluid transfer system.

The main body 205 can also include apertures 206 provided nearer the second end that are fluidly connected with the fluid lines 210 and is configured to be in fluid communication with the fluid container 1 when the fluid dispenser 14 is connected to the cap 12. The fluid dispenser 14 can also include an expanded portion 230 that can be in fluid communication with the apertures 206 provided through the main body 205 so that when a fluid is supplied or removed through the fluid lines 210 of the fluid dispenser 14, the fluid flows from the apertures 206 through the expanded portion 230 and around the insert 225 into the fluid container 1 or from the fluid container 1 around the insert 225 through the expanded portion 230 and then through the apertures 206. In an embodiment, the fluid dispenser 14 includes first retaining features 235 for engaging the outer surface of the housing 240 of the cap 12, as discussed below.

As seen in FIG. 2B, the cap 12 includes a housing 240, a cavity 245 within the housing 240, a support 250 provided in the cavity 245, and a set of seals 255. The housing 240 of the cap 12 includes second retaining features 260 that have complementary shapes with the first retaining features 235 so that the first retaining features 235 is able to engage the second retaining features 260 for secure attachment of the fluid dispenser 14 to the cap 12 and to disengage the second retaining features 260 for release of the fluid dispenser 14 from the cap 12. It is appreciated that the first retaining features 235 can include a plurality of arms that connect with the corresponding second retaining features 260, for example, having hooks that are snapped, slid, or fitted on or into the second retaining features 260. It is also appreciated that the first retaining feature 235 and second retaining features 260 can include other structures for the engaging and disengaging of the fluid dispenser, for example, the second retaining features 260 can include a plurality of slots or threads that allow engagement and rotation of the first retaining features 235 to secure the attachment of the fluid dispenser 14 to the cap 12 or can include slots, tabs, flanges, detents, hooks, or any other suitable structures for retaining the same. The set of seals 255 can include a first seal 255 around the outer surface of the housing 240 of the cap 12 that is configured to seal with the inner surface of the shell housing 215 and a second seal 255 provided around the cavity 245 for sealing the insert 255 when the insert 255 is inserted into the cavity 245 and support 250.

The cavity 245 and support 250 are provided for receiving the insert 225 for aseptically transferring of the fluid in/from the fluid container 1. For example, in an embodiment, after the cap 12 is connected to a fluid container 1 and the fluid is transferred into the fluid container 1, the fluid dispenser 14 is configured such that at least a downward directed force towards the fluid container 1 inserts the insert 225 into the support 250 of the cavity 245 and allows the disconnection of the insert 225 from the main body 205 of the fluid dispenser 14 to seal the fluid container, e.g., the insert 225 is press-fitted into the cap 12 without requiring additional equipment or change of the cap 12. It is appreciated that the insert 225 can also seal the cap 12 using other structures for engaging/disengaging the insert 225 for example, using a threaded connection system, engaging portions and recesses, bumps or protrusions, or the like.

The aseptic closure assembly 10 including the fluid dispenser 14 and the cap 12 can be made of a same material as or similar material to the materials of the fluid container 1 and/or each other or a combination thereof. In an embodiment, the fluid dispenser 14, including the main body 205, the shell housing 215, and the insert 225, and the cap 12 can be made of, for example, polyolefins such as, but not limited to, polypropylene, high-density polyethylene, linear low-density polyethylene, or the like. Other non-limiting example of polymers suitable for making various embodiments of the aseptic closure assembly 10, including the cap 12 and the fluid dispenser 14, include fluoropolymers, polyesters, polycarbonates and polyamides. It will be appreciated that the materials are examples and that the actual materials for the cap 12 and the fluid dispenser 14 can vary beyond the stated list within the principles of this disclosure or can be a blend of any of the above. In an embodiment, a material of the cap 12 is the same as a material of the fluid dispenser 14. In another embodiment, the material of the cap 12 can be different from the material of the fluid dispenser 14. In another embodiment, a material of the different components of the fluid dispenser 14, e.g., the main body 205, the shell housing 215, and the insert 225, can be made of the same material or different material, or combination thereof.

The seals 220, 255 can be an O-ring or gasket formed from, but not limited to, at least one of silicone, a fluoropolymer, ethylene-vinyl acetate (EVA), a thermoplastic, or other biocompatible flexible and/or compressible material for sealing that is relatively inert, e.g., does not leach or significantly absorb the pharmaceutical, chemical, or biological fluid, and non-reactive, or a combination thereof. The seals can also include quad-rings, or a thermoplastic material or other flexible and/or compressible material for sealing that is melt processed, for example, overmolded or insert molded, to fill grooves in the respective members with the thermoplastic or flexible material, and/or formed from any of the above materials.

The operation and connection/disconnection of the aseptic closure assembly 10 having the fluid dispenser 14 to the cap 12 will be discussed while referencing FIGS. 3A-3E below. It is understood that the aseptic closure assembly 10 can be used for transferring the fluid to or from the fluid container, which can be either filling or removing the fluid. For example, when the aseptic closure assembly 10 is used to fill the fluid container, one of the fluid lines is used to vent any gases in the fluid container that is displaced as the fluid fills the fluid container. Alternatively, when the aseptic closure assembly 10 is used to remove the fluid from the fluid container, one of the fluid lines can be used to supply an inert gas, for example, nitrogen or air, to induce the flow of fluid through the other fluid line 210 or use a negative pressure system, such as a vacuum, to remove the fluid from the fluid container. In a non-limiting example, the transfer of fluid to fill the fluid container is discussed below.

Figure 3A:
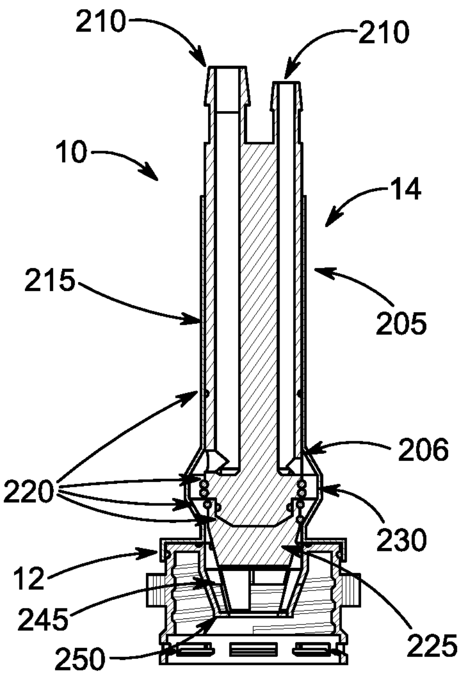
FIGS. 3A, 3B, 3C are cross-sectional views of the aseptic closure assembly of FIG. 1 showing the connection of the fluid dispenser and the cap and transfer of fluid therein, according to an embodiment.
Figure 3B:
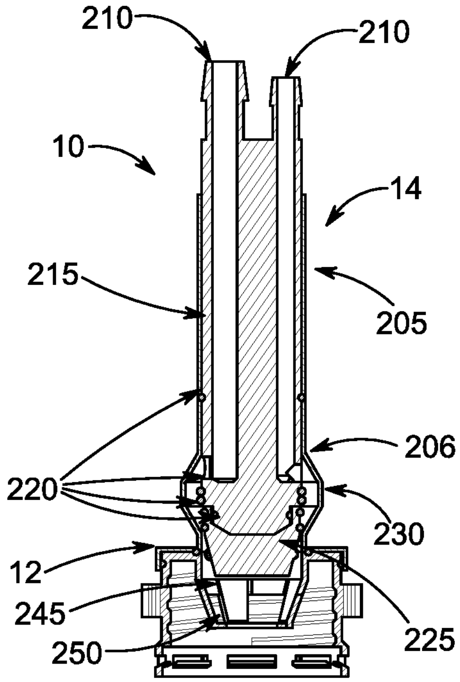
Figure 3C:
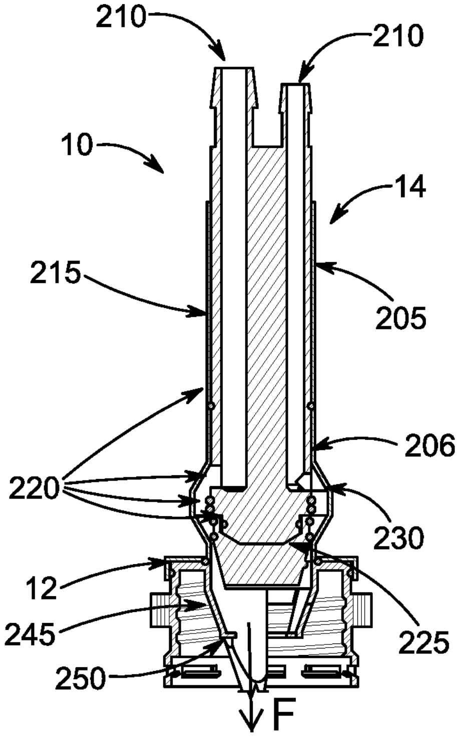

FIGS. 3A-3C illustrate the fluid dispenser 14 connected to the cap 12 for transferring a fluid, e.g., filling, into the fluid container 1, in which the cap 12 is connected and secured to the rigid opening 2 of the fluid container 1. The fluid dispenser 14 is secured to the cap 12 via the retaining features (not shown) of the fluid dispenser 14 and the cap 12. As discussed above, initially, the apertures 206 of the main body 205 are sealed with respect to the shell housing 215 between the seals 220, e.g., a first seal and a second seal, so that the fluid is not dispensable from the fluid dispenser 14. After the fluid dispenser 14 is connected to the cap 12 and the fluid is ready for transfer, the main body 205 is forced in a downward direction towards the fluid container 1 so that the apertures 206 of the main body 205 are provided in fluid communication with the expanded portion 230 of the shell housing 215. In so doing, as seen in FIGS. 3B and 3C, the second seal 220 is provided within the expanded portion so that the fluid is able to be transferred through the fluid line 210 of the fluid dispenser 14 through the apertures 206, through the expanded portion 230 and around the second end of the main body 205 and the insert 225 into the cavity 245 and the support 250 and into the fluid container 1, as shown in arrow F. It is appreciated that the fluid dispenser 14 can include a second fluid line 210 that can be used for transferring fluid and/or used as a vent to allow the venting of the fluid container 1 as the fluid displaces the gas in the fluid container 1 which follows the opposite path of the filling of the fluid.

Figure 3D:
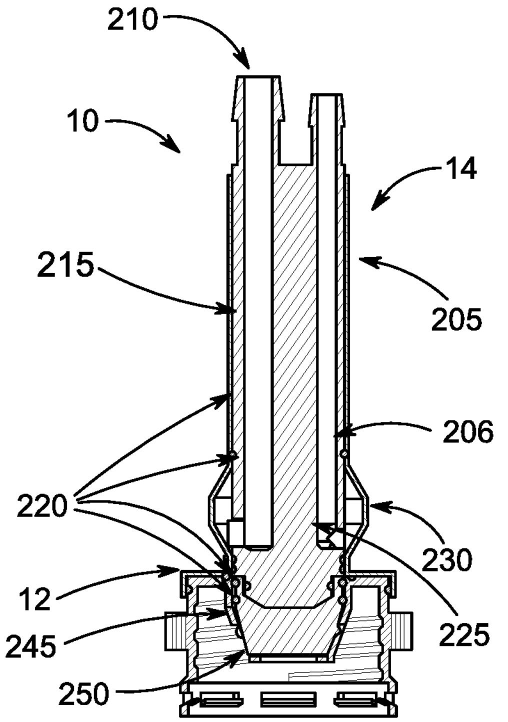
FIGS. 3D-3E are cross-sectional views of the aseptic closure assembly of FIG. 1 showing the disconnection of the fluid dispenser and the cap, according to an embodiment.
Figure 3E:
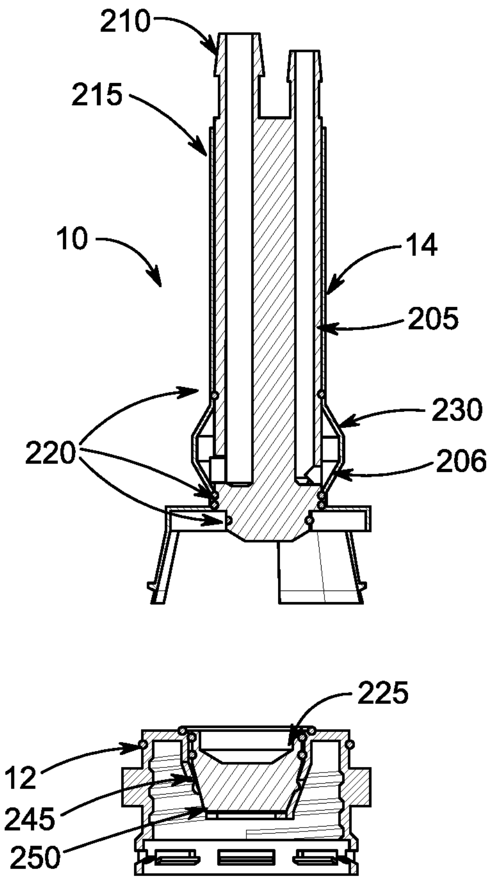

As seen in FIGS. 3D-3E, after the transfer of the fluid into the fluid container 1 is completed, the fluid dispenser 14 can be further directed downwardly towards the fluid container 1 so that the insert 225 is fitted into the support 250 of the cavity 245. The insertion of the insert 225 into the cavity 245 seals the fluid container 1 by being sealed by seals 255 that engage the insert 225 at the opening of the cavity 245. As illustrated in FIG. 3E, the engaging force of the insert 225 into the cavity 245 is greater than the engaging force of the insert 225 on the second end of the main body 205, e.g., via the compressibility and/or modulus of elasticity of the seals, so that when the fluid dispenser 14 is disengaged from the cap 12, the insert 225 is disconnected from the second end of the main body 205 and remains inserted in the cavity 245 to seal the fluid container 1 when the fluid dispenser 14 is disconnected from the cap 12. It is appreciated that the fluid dispenser 14 can be configured such that the seals 220 when pressed in the downward direction can seal the apertures 206 by having the second end of the main body sealed with the shell housing 215 or allow the movement of the main body 205 in an upward direction so that the apertures 206 are not in the expanded portion 230 but are sealed between the first and second seals 220 and the shell housing 215. It is also appreciated that the insert 225 can be engaged with the cavity 245 and/or the support 250 to seal the fluid container 1 using other removable or non-removable structures. For example, in an embodiment, the insert 225 can include retaining features, such as hooks or protrusions or threaded connections, that engage complementary retaining features in the cavity 245 and/or the support 250 to engage the insert 225 and detach the insert 225 from the main body 205. In another embodiment, the insert 225 can include permanent retaining features, such as an outwardly biased hooking structure which when inserted into the cavity is biased outwardly to engage a complementary structure in the cavity 240 and/or the support 250. In such a case, the aseptic closure assembly cannot be used in multi-use applications since the insert is permanently secured to the cap 12.

Figure 4A:
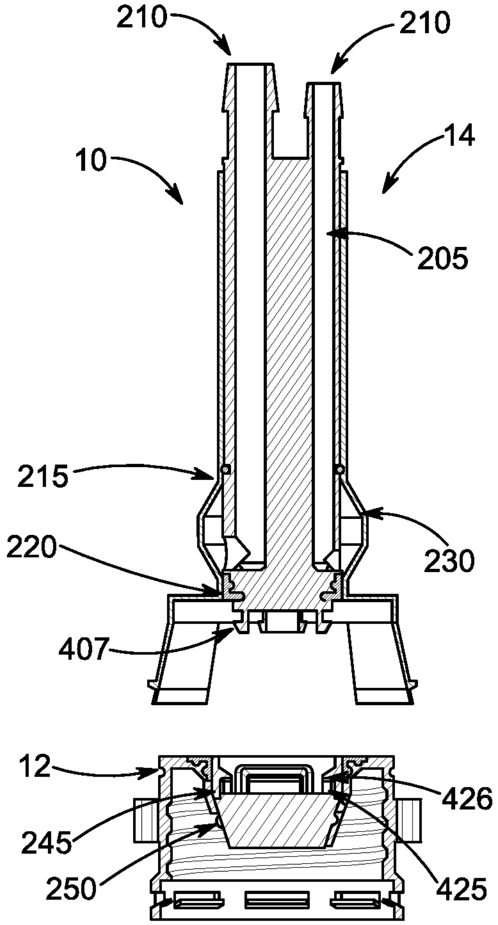
FIGS. 4A-4B are cross-sectional views of an aseptic closure assembly, according to an embodiment, showing the connection of the fluid dispenser and an insert.
Figure 4B:
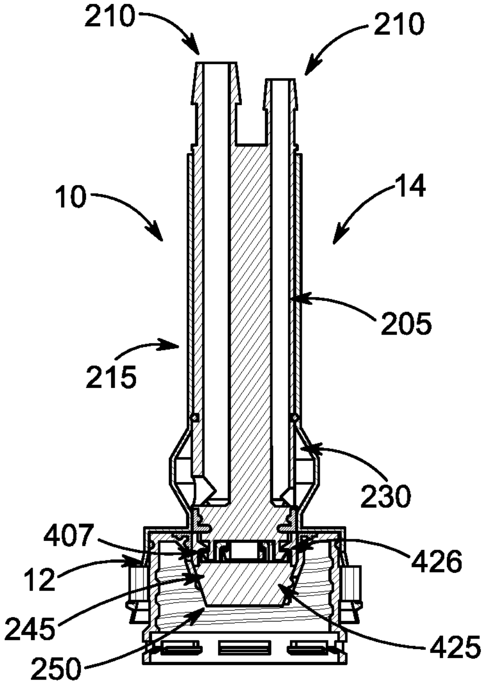

In another embodiment, as seen in FIGS. 4A and 4B, the aseptic closure assembly 10 includes an insert 425 that is removable from the cavity 240 and/or the support 250 of the cap 12. The aseptic closure assembly 10 of FIGS. 4A and 4B has the same or similar features as the aseptic closure assembly 10, discussed above with respect to FIGS. 2A and 2B, in which the components having the same or similar features are not discussed in detail below. For example, as seen in FIG. 4A, the second end of the main body 205 includes engagement pieces 407, for example, hooking pieces, for engaging complementary engagement pieces or members 426 of the insert 425. In an embodiment, the complementary engagement pieces or members 426 of the insert 425 can include openings that allow the engagement pieces 407 of the main body 205 to be inserted below the engagement pieces or members 426 that such that a rotation of the main body 205 of the fluid dispenser 14 engages the engagement pieces 407 of the main body 205 with the complementary engagement pieces or members 426 of the insert 425. Thus, when the insert 425 is inserted into the cap 12 of the fluid container 1 for sealing the same, as illustrated in FIG. 4B, when an upward force is applied to the main body 205 of the fluid dispenser 14, the engagement pieces 407 of the main body 205 engage the complementary engagement pieces or members 426 of the insert 425, such that the insert 425 is removable from the cavity 245 and/or the support 250 such that fluid is able to be transferred, e.g., filled or removed, from the fluid container 1. After the transfer of the fluid with the fluid container 1 is completed, the insert 425 can be removed or, as illustrated in FIG. 4A, the insert 425 can be fitted into the support 250 of the cavity 245 by directing the main body 205 of the fluid dispenser 14 downwardly towards the fluid container 1 (as discussed above with respect to FIGS. 2A, 2B) and rotating the main body 205 such that insert 425 is disengaged from the main body 205 by having the engagement pieces 407 of the main body 205 removed through the openings in the insert 425. The insertion of the insert 425 into the cavity 245 seals the fluid container 1 by having the insert 425 and seal 255 seal the opening of the cavity 245. It is appreciated that, in an embodiment, the seals 220 on the second end of the main body 205 prevents contamination of any containments on the top surface of the insert 425 by sealing the main body 205 with the insert 425 during the fluid transfer. It is also appreciated that in an embodiment, films, caps, valves, or similar sealing devices that maintain a hermetic seal can be attached and/or coupled to the cap 12 of the fluid container and/or the fluid dispenser 14 for the aseptic connection/disconnection of the fluid container. The film, caps, valves, or similar sealing devices can then be punctured, removed, and/or turned to allow the transfer of the sterile fluids when the fluid container is coupled to the fluid dispenser 14.

Figure 5A:
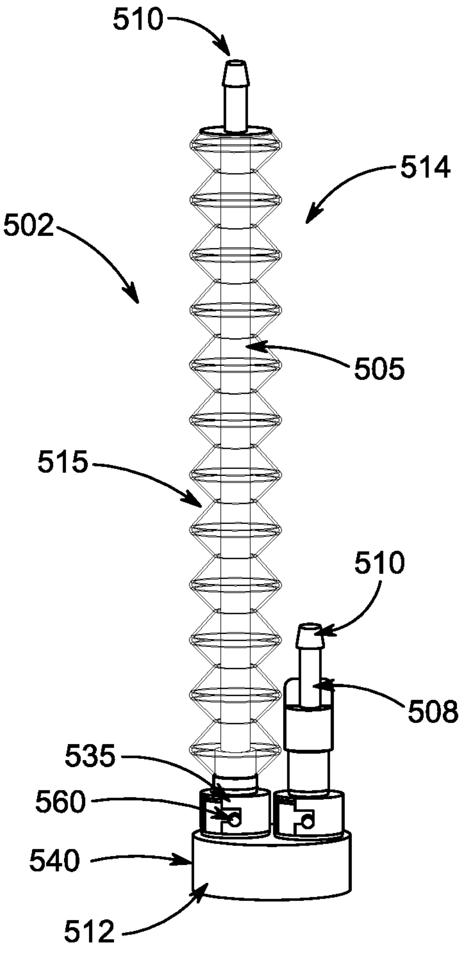
FIGS. 5A-5B are perspective and cross-sectional views of an aseptic closure assembly according to another embodiment.
Figure 5B:
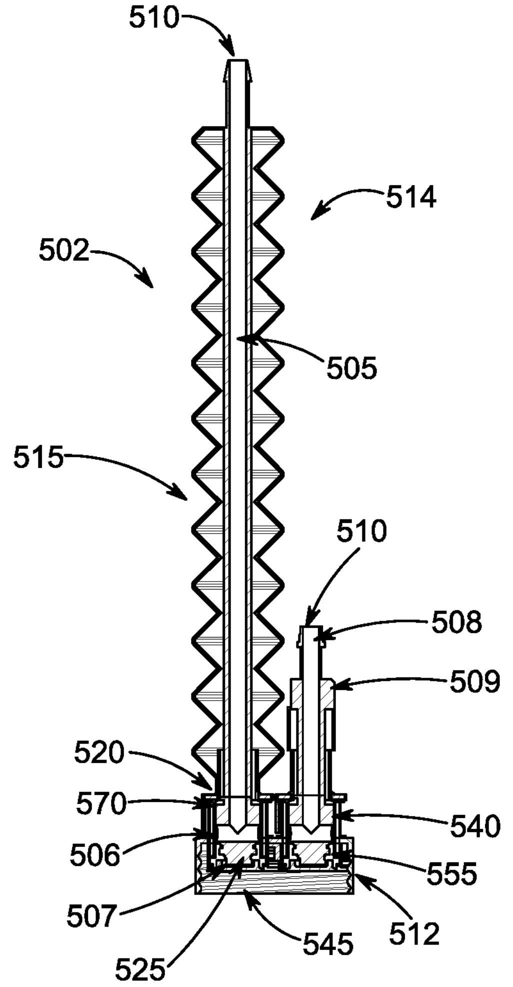

FIGS. 5A and 5B are schematic and cross-sectional views of an aseptic closure assembly 502 for a fluid container (for example, fluid container 1, as discussed above), according to another embodiment. The aseptic closure assembly 502 includes a cap 512 that is connectable to the fluid container and a fluid dispenser 514, in which the cap 512 and the fluid dispenser 514 are configured to couple together to form a sealed aseptic fluid connection. The fluid dispenser 514 includes a fluid passage through a main body 505 and a fluid passage through a secondary body 508 that extend from an opening. The cap 512 is configured to aseptically connect the fluid passage(s) of the fluid dispenser 514 to the fluid container to provide fluid communication when the fluid dispenser 514 is connected to the cap 512, as further discussed below.

Thus, the aseptic closure assembly 502 is configured to connect and disconnect from a fluid container for the aseptic transferring of fluids in a fluid container that can be used in temperatures as low as −85° C. It is appreciated that the aseptic closure assembly 502 can also be used at other temperatures, such as 0° C., room temperature, or the like, while maintaining the benefits of the present disclosure. Accordingly, the fluid container having the aseptic closure assembly 502, as discussed above, is configured to be stored at frozen temperatures (e.g., temperatures of less than 0° C. and lower). In an embodiment, the fluid container having the aseptic closure assembly 502 can also be heated back to ambient temperature without having any substantial deformation. Substantial deformation includes, for example, visible cracking in the material, a shrinkage or expansion relative to its original shape at ambient temperature that can interfere with the connection(s) or adversely affect sealing of said connection(s). Temperature retraction testing can be performed according to ASTM D1329, ISO 2921, or any other suitable testing methodology for determining suitable retraction properties of the material at temperatures that may be used. Brittleness testing can be performed according to ASTM D2137, ISO 28702, or any other suitable testing methodology for determining resistance to cracking at temperatures that may be used.

The cap 512 is connectable to the rigid opening of the fluid container to secure the cap 512 to the fluid container. The cap 512 can be connected to the fluid container by press fitting the cap 512 to the rigid opening or the cap 512 and the rigid opening can include mutually engaging threading. It is appreciated that the cap 512 can also be connected to the fluid container 1 in other manners, for example, using mechanical fasteners, such as, clamps, respective engagement features, or the like, or welding or bonding techniques, such as, heat bonding, impulse welding, laser welding, ultrasonic welding, or similar fusion bonding/melt welding techniques. In an embodiment, the cap 512 can be connected to the fluid container using a tamper evident connecting system. For example, the cap 512 having the tamper evident connection system can include inwardly biasing retaining arms that engage corresponding protrusions around the rigid opening of the fluid container which once pressed to a predetermined position on the rigid opening the cap 512 is not able to be easily removed from the fluid container without leaving visible indications of damage to the cap 512 and/or the fluid container. In another embodiment, the cap 512 having the tamper evident connection system can include a protrusion at a lower portion of the threading, so that once the cap 512 is threaded to a predetermined position, the cap 512 is not able to be removed from the fluid container 512, e.g., by reversing the rotation of the cap 512 on the rigid opening. In yet another embodiment, the tamper evident connection system can include a ring on the cap 512, which separates from the cap 512, if the cap 512 is removed from the fluid container. Thus, the tamper evident connection system is able to alert a customer or user of the fluid container having the cap 512 if the fluid container has been opened, or attempted to be opened, and possibly contaminated and/or compromised.

The cap 512 includes a housing 540, a cavity 545 within the housing 540, ports 570, and a set of seals 255. The housing 540 of the cap 512 includes second retaining features 560 that have complementary shapes with first retaining features 535 on the main body 505 and secondary body 508 of the fluid dispenser 514 for engaging the outer surface of the housing 540 of the cap 512. The first retaining features 535 are able to engage the second retaining features 560 for secure attachment of the fluid dispenser 514 to the cap 512 and to disengage for release of the fluid dispenser 514 from the cap 512. For example, in an embodiment, the second retaining features 560 can include pins or protrusions that engage respective slots formed by the first retaining features 535 on the main body 505 and secondary body 508 of the fluid dispenser 514. The insert 525 is configured to be engageable and disengageable with the port 570 so that a fluid communication channel is able to be opened and closed between the fluid container and the ports 570, as further discussed below. For example, in an embodiment, after the cap 512 is connected to a fluid container, the fluid dispenser 514 is configured to engage the insert 525 such that a downward directed force towards the fluid container and a rotation thereof connects the insert 525 onto the fluid dispenser 514 and allows the disconnection of the insert 525 from the port 570 to allow the main body 505 (and/or secondary body 508) of the fluid dispenser 514 to be inserted into the fluid container to aseptically transfer fluid to/from the fluid container. After the fluid has been transferred with the fluid container, it is appreciated that the insert 525 can be reengaged with the port 570 such that the insert 525 and the seal 555 seals the ports 570 from fluid communication with the fluid container.

Figure 6A:
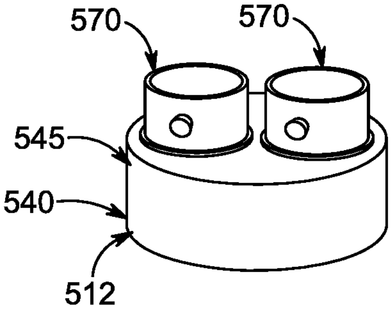
FIGS. 6A, 6B, 6C are perspective, exploded, and cross-sectional views of a cap of the aseptic closure assembly of FIGS. 5A-5B, according to an embodiment.
Figure 6B:
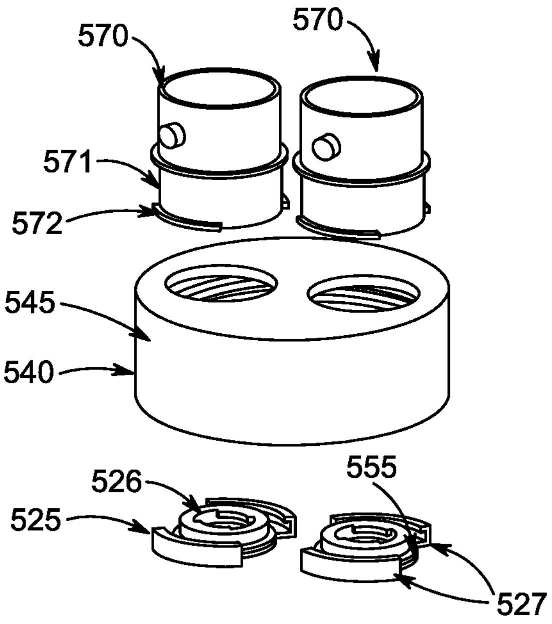
Figure 6C:
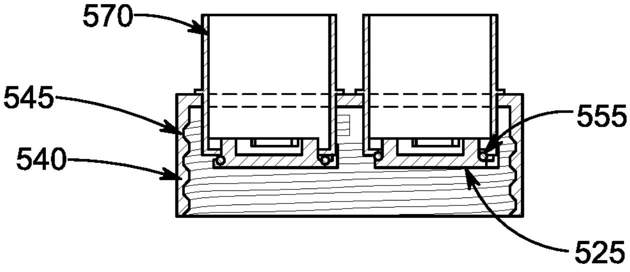

For example, in an embodiment, as seen in FIGS. 6A, 6B, 6C, the cap 512 includes the housing 540, the cavity 545 within the housing 540, the ports 570 connected to the cavity, and the set of seals 555. The ports 570 each include a port shell 571 and an insert 525 connected to one end of the port shell 571. The insert 525 is configured to be engageable and disengageable with the port shell 571 so that a fluid communication channel is able to be opened and closed between the fluid container and the port 570, as further discussed below. For example, in an embodiment, the insert 525 includes outer engagement pieces or members 527 that are spaced apart around the circumference or outer perimeter of the insert 525 that are engageable with outer complementary engagement pieces or members 572 provided on an outer surface of the port shell 571. In an embodiment, spaces are provided between the outer engagement pieces or members 527 and the complementary engagement pieces or members 572, such that the insert 525 is able to be engaged and disengaged with the port shell 571 by a rotation of the insert 525 by being positioned in the respective spaces. It is appreciated that when the insert 525 is engaged with the port shell 571, the seal 555, which is provided along the inner periphery of the outer engagement pieces or members 527, seals the port 570 from fluid communication with the fluid container. It is appreciated that the ports 570 can be of the same or similar structure or have different structures, as discussed below.

Figure 7A:
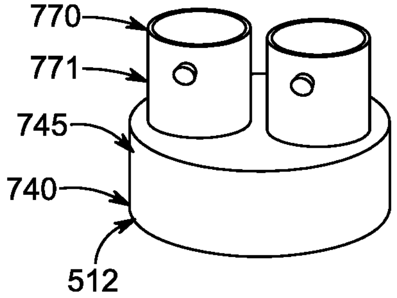
FIGS. 7A, 7B, 7C are perspective, exploded, and cross-sectional views of a cap of the aseptic closure assembly of FIGS. 5A-5B, according to another embodiment.
Figure 7B:
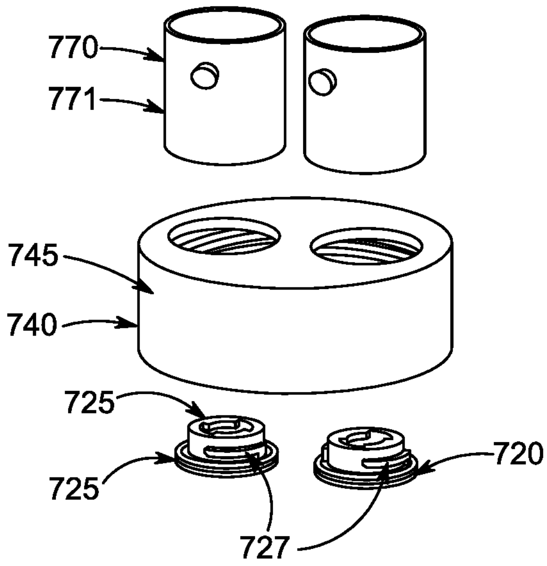
Figure 7C:
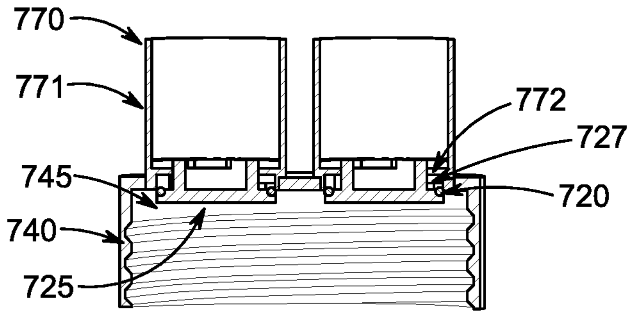

In another embodiment of the cap 512, as seen in FIGS. 7A, 7B, 7C, the cap 512 includes a housing 740, cavity 745 within the housing 740, ports 770 connected to the cavity, and a set of seals 720. The port 770 each include a port shell 771 and an insert 725 connected to one end of the port shell 771. The insert 725 is configured to be engageable and disengagable with the port shell 771 so that a fluid communication channel is able to be opened and closed between the fluid container and the port 770, as further discussed below. For example, in an embodiment, the insert 725 includes outer engagement pieces or members 727 that are spaced apart around an outer surface of the insert 725 that are engageable with outer complementary engagement pieces or members 772 that are provided along an inner periphery of the port shell 771. In an embodiment, spaces are provided between the outer engagement pieces or members 727 and the complementary engagement pieces or members 772, such that the insert 725 is able to be engaged and disengaged with the port shell 771 by a rotation of the insert 725 by being positioned in the respective spaces. It is appreciated that when the insert 725 is engaged with the port shell 771, the seal 720, which is provided along the outer periphery of the insert 725, seals the port 770 from fluid communication with the fluid container. It is appreciated that while the insert 525, 725 and port shell 571, 771 have been discussed above having the outer engagement pieces and complementary engagement pieces or members, such disclosure is intended to be a non-limiting disclosure in which other mechanical structures that allows the insert to be engageable and disengageable with the port is included herein. For example, a threaded connection or a snap-fitting could also be used for engaging and disengaging the insert from the port.

It is appreciated that while the cap 512 has been illustrated and shown as being separate pieces, such disclosure is not intended to be limiting. For example, the cap 512 can be constructed from ports that are connected to the housing, or the cap 512 can be constructed as a single molded piece or component. Different inserts can then be used to complement the engagement pieces of the fluid dispenser. It is also appreciated that the ports 570 can be a single port provided for the cap 512, in which the port 570 is configured to allow connection to two separate fluid lines in a fluid dispenser connected to the same.

Referring back to FIGS. 5A and 5B, the fluid dispenser 514 includes a main body 505 having a first end and a second end, a secondary body 508 having a first end and a second end, fluid lines 510 connected to the main body 505 and the secondary body 508, a shell housing 515 provided around the main body 505, a secondary housing 509 provided around the secondary body 508, and a set of seals 520. The main body 505 and the secondary body 508 each include apertures 506 provided nearer the second end that are fluidly connected with the fluid lines 510 and is configured to be in fluid communication with the fluid container when the fluid dispenser 514 is connected to the cap 512. In an embodiment, the shell housing 515 and the secondary housing 509 of the fluid dispenser 514 each include first retaining features 535 for engaging the outer surface of the housing 540 of the cap 512, as discussed above. The shell housing 515 includes a collapsible structure such that the fluid line 510 can be inserted into the fluid container while maintaining the sterility of the fluid line 510. For example, in an embodiment, the shell housing 515 includes an accordion-like structure having bellows that collapse and expand to allow the compression and expansion of the shell housing 515 as the fluid line 510 is moved into and out of the shell housing 515, e.g., when the fluid line 510 is used as a dip-tube for insertion into the fluid container. It is appreciated that other collapsible structures can be used, for example, sliding shells with seals in a shell housing, or similar structure that allows an aseptic fluid communication with the fluid container. The secondary body 508 can have the same or similar structure as the main body 505 and in an embodiment, the secondary body 508 includes the secondary shell housing 509 around the secondary body 508 which only allows a partial movement of the fluid line 510 into the fluid container by a rotation of the secondary body 508, e.g., does not have a structure as a dip tube, but only allows a partial insertion into the fluid container.

The fluid lines 510 nearer the first end of the main body 505 and the secondary body 508 can include a tube connector for connecting to a fluid transfer system for the transfer, e.g., filling or removing, of the fluid with respect to the fluid container. The tube connector can be selected from the group consisting of a hose barb, an overmolded connection, a screw connection, a press-fit connection, a snap-fit connection, or a combination thereof. It is also appreciated that the tube connector can be continuously formed with the fluid transfer system, for example, by molding or overmolding the fluid dispenser with the fluid transfer system.

In an embodiment, the fluid dispenser 514 including the main body 505 and the secondary body 508 includes engagement pieces 507, for example, a protrusion that has a shape that matches the complementary engagement members 526, 726 (as illustrated in FIGS. 6B, 7B) of the insert 525, 725 on the second end of the main body 505 and the secondary body 508. For example, the engagement members 526, 726 include an opening that is able to receive the engagement pieces 507 of the main body 505 and/or the secondary body 508 such that a rotation of the main body 505 and/or the secondary body 508 of the fluid dispenser 514 engages the engagement pieces 507 of the main body 505 and/or the secondary body 508 with the complementary engagement pieces or members 526, 726 of the insert 525, 725. Accordingly, when a downward and rotational force is applied to the main body 505 and/or the secondary body 508 of the fluid dispenser 514, the engagement pieces 507 of the main body 505 and/or the secondary body 508 engage the complementary engagement members 526, 726 of the insert 525, 725, such that a further rotation of the main body 505 and/or the secondary body 508 rotates the insert 525, 725 to disengage the insert 525, 725 from the port 570. The insert 525, 725 can then be inserted into the fluid container such that fluid is able to be transferred, e.g., filled or removed, from the fluid container. After the transfer of the fluid with the fluid container is completed, the insert 525, 725 can be directed upwardly towards the port 570 such that the insert 525, 725 can be rotated to engage and seal the port 570. The insertion of the insert 525, 725 into the cavity 545 and the port 570 seals the fluid container by having the insert 525, 725 and the seals 555 seal the port 570. It is appreciated that in an embodiment, films, caps, valves, or similar sealing devices that maintain a hermetic seal can be attached and/or coupled to the cap 512 and/or the ports 570 of the fluid container and/or the fluid dispenser 514 for the aseptic connection/disconnection of the fluid container. The film, caps, valves, or similar sealing devices can then be punctured, removed, and/or turned to further allow the transfer of the sterile fluids when the fluid dispenser 514 is coupled to the fluid container.

The aseptic closure assembly 502 including the fluid dispenser 514 and the cap 512 can be made of a same material as or similar material to the materials of the container and/or each other or a combination thereof. In an embodiment, the fluid dispenser 514, including the main body 505, the secondary body 508, the shell housing 515, the secondary shell housing 509, and the insert 525, and the cap 512 can be made of, for example, polyolefins such as, but not limited to, polypropylene, high-density polyethylene, linear low-density polyethylene, or the like. Other non-limiting example of polymers suitable for making various embodiments of the aseptic closure assembly 502, including the cap 512 and the fluid dispenser 514, include fluoropolymers, polyesters, polycarbonates and polyamides. It will be appreciated that the materials are examples and that the actual materials for the cap 512 and the fluid dispenser 514 can vary beyond the stated list within the principles of this disclosure or can be a blend of any of the above. In an embodiment, a material of the cap 512 is the same as a material of the fluid dispenser 514. In another embodiment, the material of the cap 512 can be different from the material of the fluid dispenser 514. In another embodiment, a material of the different components of the fluid dispenser 514, e.g., the main body 505, the secondary body 508, the shell housing 515, the secondary shell housing 509, and the insert 525, can be made of the same material or different material, or combination thereof. In an embodiment, the shell housing 515 can be made from silicon or a flexible polymer to allow the compression and expansion of the shell housing.

The seals 520, 555 can be an O-ring or gasket formed from, but not limited to, at least one of silicone, a fluoropolymer, ethylene-vinyl acetate (EVA), a thermoplastic, or other biocompatible flexible and/or compressible material for sealing that is relatively inert, e.g., does not leach or significantly absorb the pharmaceutical or biological fluid, and non-reactive, or a combination thereof. The seals can also include quad-rings, or a thermoplastic material or other flexible and/or compressible material for sealing that is melt processed, for example, overmolded or insert molded, to fill grooves in the respective members with the thermoplastic or flexible material, and/or formed from any of the above materials.

The operation and connection/disconnection of the fluid dispenser 514 to the cap 512 will be discussed while referencing FIGS. 8A-9C below. It is appreciated that any of the inserts or ports and associated structures discussed above can be used, but discussed below with respect to the insert 525 as a non-limiting example.

Figure 8A:
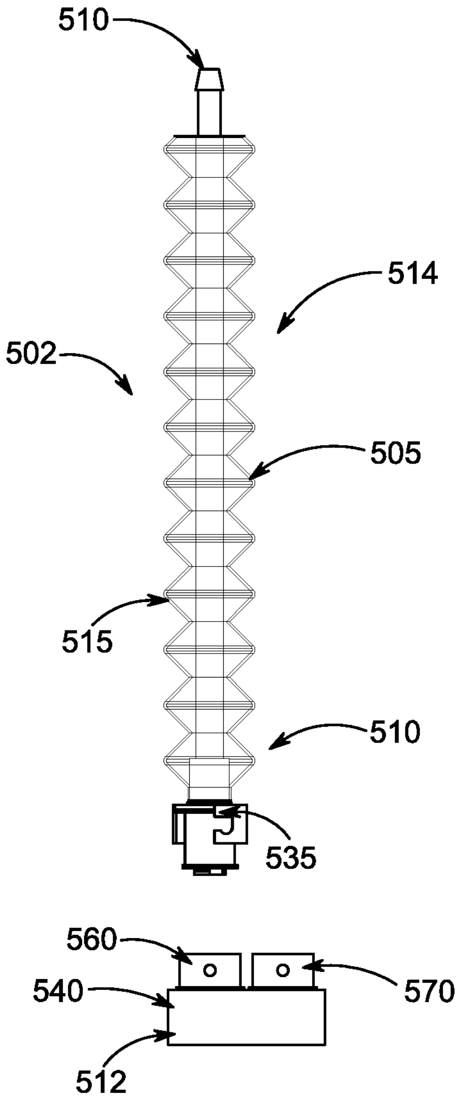
FIGS. 8A, 8B are perspective and cross-sectional views of the aseptic closure assembly of FIGS. 5A-5B showing the connection of the fluid dispenser and the cap, according to an embodiment.
Figure 8B:
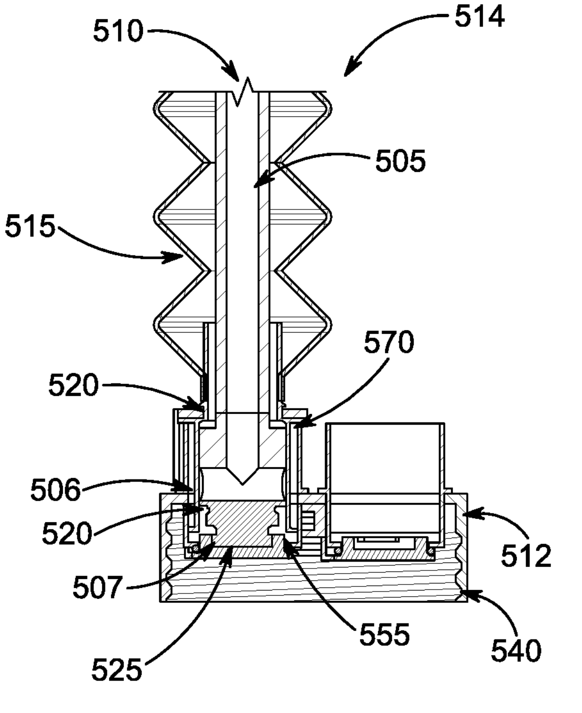

FIGS. 8A and 8B illustrate the main body 505 of the fluid dispenser 514 connecting to the cap 512 for transferring a fluid, e.g., filling, into the fluid container, in which the cap 512 is connected and secured to the rigid opening of the fluid container. The main body 505 of the fluid dispenser 514 is secured to the cap 512 via a rotation of the first retaining features 535 of the fluid dispenser 514 onto the second retaining features 560 on the port 570 of the cap 512. Initially, the apertures 506 of the main body 505 are sealed with respect to the shell housing 515 between the seals 520, e.g., a first seal and a second seal, so that the fluid is not dispensable from the main body 505 of the fluid dispenser 514. After the main body 505 of the fluid dispenser 514 is connected to the cap 512 and the fluid is ready for transfer, the main body 505 is forced in a downward direction towards the fluid container and rotated such that the engagement pieces 507 on the main body 505 engage the complementary engagement members 526 of the insert 525. After engagement of the main body 505 and the insert 525, the main body 505 is further rotated such that the outer engagement pieces 527 is disengaged from the complementary engagement pieces or members 572 of the port 570 such that the fluid line 510 and the insert 525 are insertable into the fluid container to create an aseptic fluid communication channel between the fluid dispenser 514 and the fluid container.

Figure 8C:
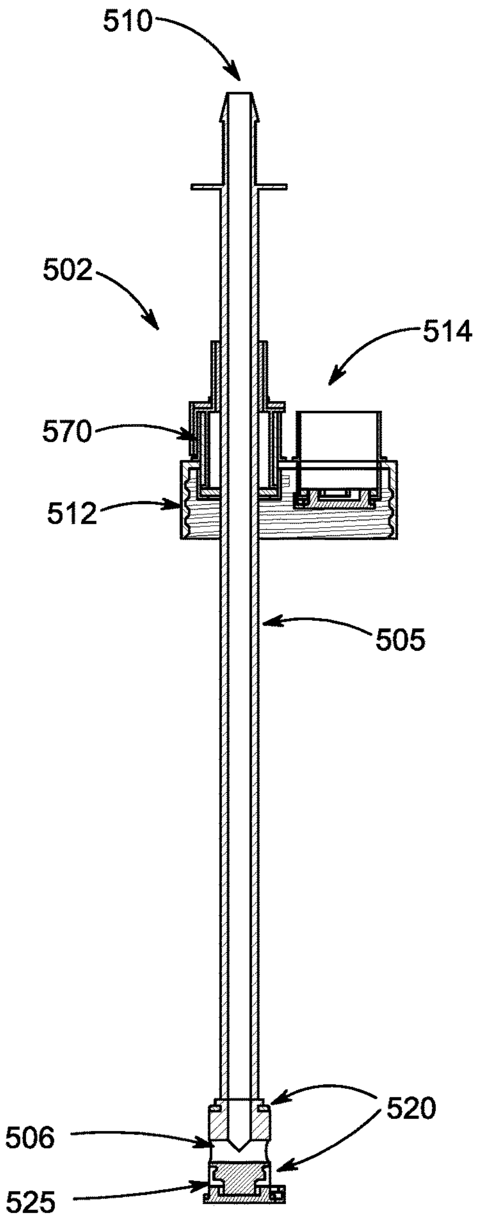
FIGS. 8C, 8D are perspective views of the aseptic closure assembly of FIGS. 5A-5B with a fluid container, according to an embodiment.
Figure 8D:
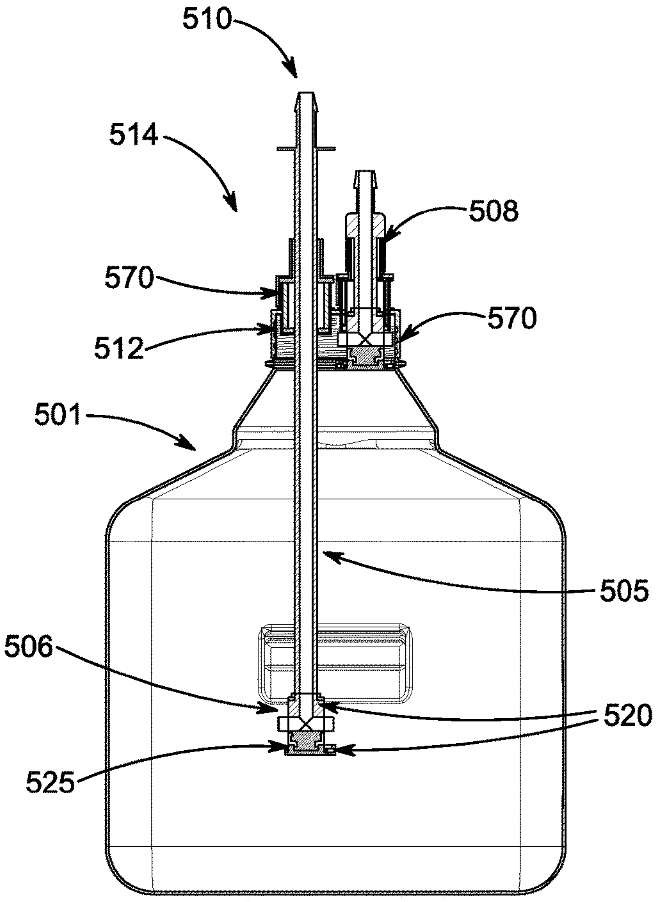

For example, as seen in FIGS. 8C and 8D, the fluid line 510 and insert 525 can be directed downwardly towards the fluid container 501 such that the apertures 506 are not positioned between the seals 520 and the shell housing (not shown). The apertures 506 and the insert 525 can then be displaced within the fluid container 501 at different heights for the transfer of fluid to/from the fluid container 501, e.g., as a dip tube that can be lowered (or raised) near the fluid level to prevent foaming or allow the draining of the fluid. In an embodiment, as the apertures 506 and the insert 525 are displaced into the fluid container 501, the shell housing (for example, the shell housing 515 having an accordion-like structure having bellows) can be collapsed and expanded to allow the compression and expansion of the shell housing and insertion of the fluid line 510 into the fluid container. In so doing, the outer surface of the fluid line 510 can remain sterile since the outer surface of the fluid line 510 only contacts the inner surface of the shell housing and the fluid in the fluid container 501. It is also appreciated that since the fluid line 510 is able to be lowered (or raised) at different heights, such structure allows the automatic filling or removal of fluid from the fluid container 501. For example, the shell housing and/or the fluid line when the shell housing is transparent) can include index marks or measurements to show the depth of the fluid line into the fluid container 501. Thus, the depth of insertion of the fluid line 510 can be controlled for the filling and/or removal of the fluid from the fluid container 501.*s*

After the fluid transfer process has been completed, the apertures 506 and insert 525 can be raised in an upward direction such that the apertures 506 are positioned between the seals 520 and the shell housing 515 and the insert 525 is engaged with the port 570 by rotation of the insert 525. It is appreciated that when the insert 525 is engaged with the port 570, the seal 555, which is provided along the inner periphery of the outer engagement pieces or members 527, and the insert 525 seal the port 570 from fluid communication with the fluid container 501. Upon a further rotation of the main body 505, the engagement pieces 507 on the main body 505 disengage with the complementary engagement members 526 of the insert 525. Accordingly, upon rotation of the fluid dispenser 514 so that the first retaining features 535 of the main body 505 of the fluid dispenser are disengaged with the second retaining feature 560 on the port 570 of the cap 512, the fluid dispenser 514 can be removed from the cap 512 and the fluid container 501. It is appreciated that since the insert 525 is only in contact with the fluid dispenser 514 for the transfer of fluid with the fluid container 501, the fluid handling system remains closed, since a secondary step is not required to seal the fluid container 501, e.g., replacing the aseptic closure assembly with a stopper or the like which makes the fluid handling system susceptible to contamination.

Figure 9A:
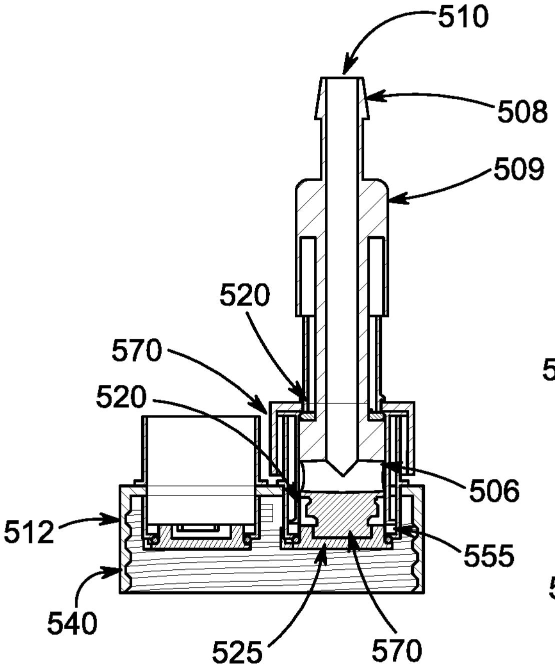
FIGS. 9A, 9B are cross-sectional views of a secondary body and a second port of the aseptic closure assembly, according to an embodiment.
Figure 9B:
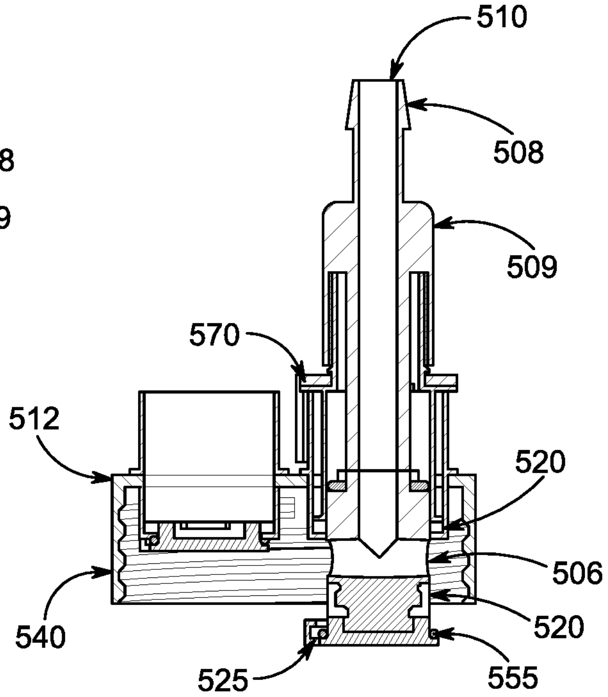

Similarly, as seen in FIG. 8D, the secondary body 508 of the fluid dispenser 514 can be connected to the cap 512 via a rotation of the first retaining features 535 onto the second retaining features 560 on the port 570 of the cap 512. For example, as seen in FIGS. 9A-9B, initially, the apertures 506 of the secondary body 508 are sealed with respect to the secondary shell housing 509 between the seals 520, e.g., a first seal and a second seal, so that the fluid is not transferrable via the secondary body 508 of the fluid dispenser 514. After the fluid dispenser 514 is connected to the cap 512 and the fluid is ready for transfer, the secondary body 508 can be forced in a downward direction towards the fluid container 501 and rotated such that the engagement pieces 507 on the secondary body 508 engage the complementary engagement members 526 of the insert 525. After engagement of the secondary body 508 and the insert 525, the secondary body 508 is further rotated such that the outer engagement pieces 527 is disengaged from the complementary engagement pieces or members 572 of the port 570 such that the fluid line 510 and the insert 525 are insertable into the fluid container to create a fluid communication channel between the secondary body 508 of the fluid dispenser 514 and the fluid container.

For example, as seen in FIG. 9B, the fluid line 510 and insert 525 can be directed downwardly towards the fluid container 501 such that the apertures 506 are not positioned between the seals 520 and the secondary housing 509. The apertures 506 and the insert 525 can then be displaced within the fluid container 501 below the cap 512 for the transfer of fluid to/from the fluid container 501. In an embodiment, as the apertures 506 and the insert 525 are displaced into the fluid container 501, the secondary shell housing 509 allows at least a partial movement of the fluid line 510 into the fluid container 510 such that portions of the outer surface of the fluid line 510 are not exposed to the environment to maintain the sterility of the fluid.

After the fluid transfer process has been completed, the apertures 506 and insert 525 can be raised in an upward direction such that the apertures 506 are positioned between the seals 520 and the secondary shell housing 509 and the insert 525 is engaged with the port 570 by rotation of the insert 525. It is appreciated that when the insert 525 is engaged with the port 570, the seal 555, which is provided along the inner periphery of the outer engagement pieces or members 527, and the insert 525 seal the port 570 from fluid communication with the fluid container 501. Upon a further rotation of the secondary body 508, the engagement pieces 507 on the secondary body 508 disengage with the complementary engagement members 526 of the insert 525. Accordingly, upon rotation of the secondary body 508 of the fluid dispenser 514 the first retaining features 535 of the secondary housing shell 509 are disengaged with the second retaining feature 560 on the cap 512, and the fluid dispenser 514 can be removed from the cap 512 and the fluid container 501. It is appreciated that since the insert 525 is only contacted with the fluid dispenser 514 for the transfer of fluid with the fluid container 501, the fluid handling system remains closed, since a secondary step is not required to close the fluid container 501, e.g., replacing the aseptic closure assembly with a stopper or the like which makes the fluid handling system susceptible to contamination.

Figure 10B:
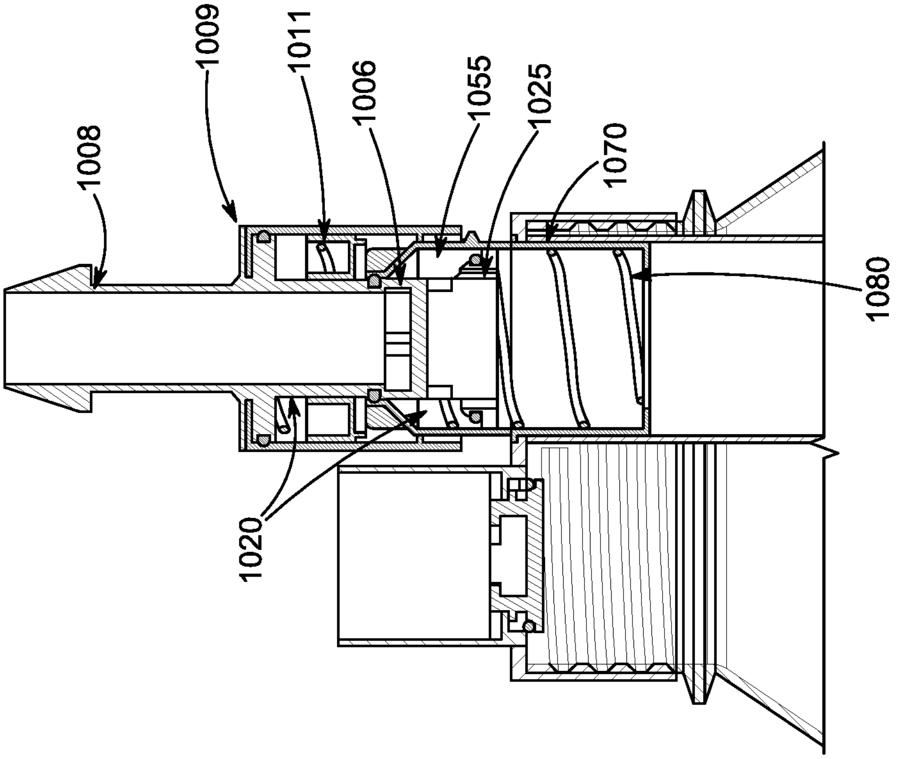
FIGS. 10A, 10B are cross-sectional views of a secondary body and a second port of the aseptic closure assembly, according to another embodiment.
Figure 10A:
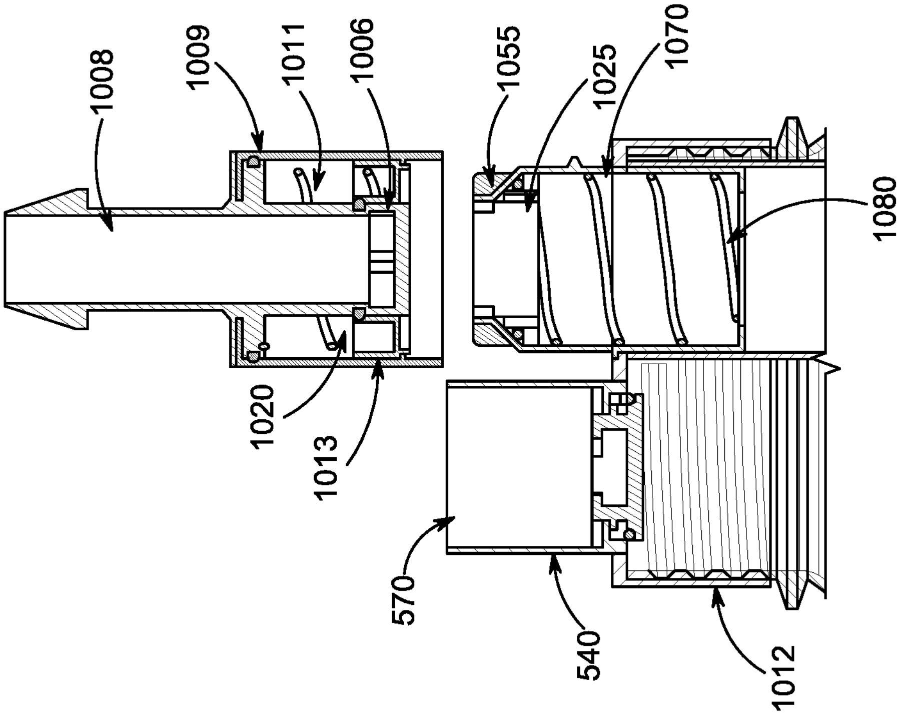

Another embodiment of the secondary body and second port are shown in FIGS. 10A-10B. In this embodiment, a second port 1070 has a different structure than the first port (for example, port 570, as discussed above) and a secondary body 1008 has a different structure than the secondary body 508. For example, in an embodiment, the cap 1012 includes a first cavity and a first port (for example, cavity 545 and port 570, as shown in FIGS. 5A-9B) and a second cavity 1045 and a second port 1070 connected to the second cavity 1045. The second port 1070 includes a second shell 1071, a second insert 1025 provided to seal one end of the second port 1070, and a first spring 1080 that biases the second insert 1025 in a closed position, e.g., an upward position away from the fluid container. The fluid dispenser includes the secondary body 1008 having a second shell housing 1009, a sealing end 1013 provided within the second shell housing 1009, a second spring 1011 that biases the sealing end 1013 towards the apertures 1006 of the secondary body 1008 in the second shell housing 1009, and a third set of seals 1020. The second shell housing 1009 is configured to engage an outer surface of the second port 1070 so that the connection of the second shell housing 1009 to the second port 1070 causes the secondary body 1008 to bias the insert 1025 towards the fluid container to provide a second fluid communication channel between the secondary body 1008 and the fluid container.

As seen in FIG. 10A, initially, the apertures 1006 of the secondary body 1008 are sealed with respect to the secondary shell housing 1009 between the seal 1020, e.g., a first seal, and the sealing end 1013, so that the fluid is not transferrable via the secondary body 1008 of the fluid dispenser. After the secondary body 1008 of the fluid dispenser is connected to the cap 1012 and the fluid is ready for transfer, the sealing end 1013 is biased away from the second end of the secondary body 1008 to open the fluid communication channel of the apertures 1006. The secondary boy 1008 can also be forced in a downward direction towards the fluid container and rotated such that the insert 1025 can be biased towards the fluid container to form a fluid communication channel between the apertures 1006 of the secondary body 1008 of the fluid dispenser and the fluid container. For example, in an embodiment, a downward directed force towards the fluid container biases the sealing end 1013 with respect to the second shell housing 1009 so that the apertures 1006 can be in fluid communication with the port 1070. The second end of the secondary body 1008 engages with the insert 1025 such that the downward directed force then displaces the insert 1025 with respect to the port 1070 so that fluid can flow around the insert 1025 into the fluid container.

After the fluid transfer process has been completed, the apertures 1006 and insert 1025 can be rotated so that the spring 1080 biases the insert 1025 and in the closed position. The insert 1025 is engaged with the second port 1070 so that the seal 1055 and insert 1025 seal the port 1070 from fluid communication with the fluid container. Upon a further rotation of the secondary body 1008, the second shell housing 1009 is disengaged with the second port 1070 and the spring 1011 biases the sealing end 1013 towards the second end of the secondary body 1008 such that the apertures 1006 are positioned between the seal 1020 of the secondary body 1008 and the sealing end 1013. It is appreciated that since the insert 1025 is only contacted with the secondary body 1008 of the fluid dispenser for the transfer of fluid with the fluid container, the fluid handling system remains closed, since a secondary step is not required to close the fluid container, e.g., replacing the aseptic closure assembly with a stopper or the like which makes the fluid handling system susceptible to contamination.

Figure 11B:
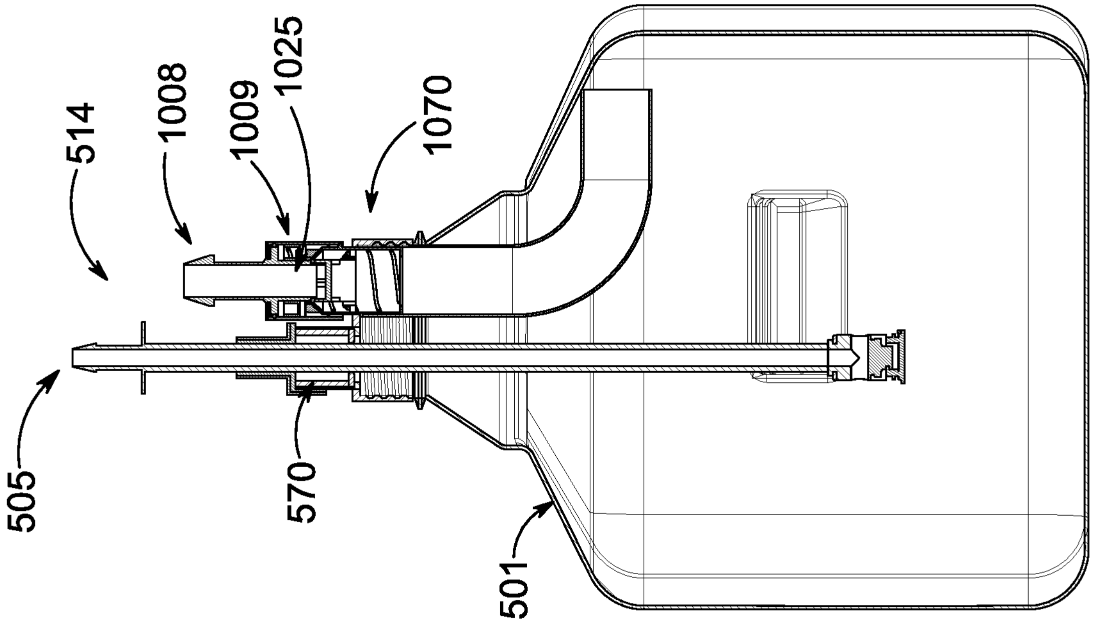
FIGS. 11A, 11B are perspective views of the secondary body and the second port of the aseptic closure assembly, according to the embodiment of FIG. 10A-10B.
Figure 11A:
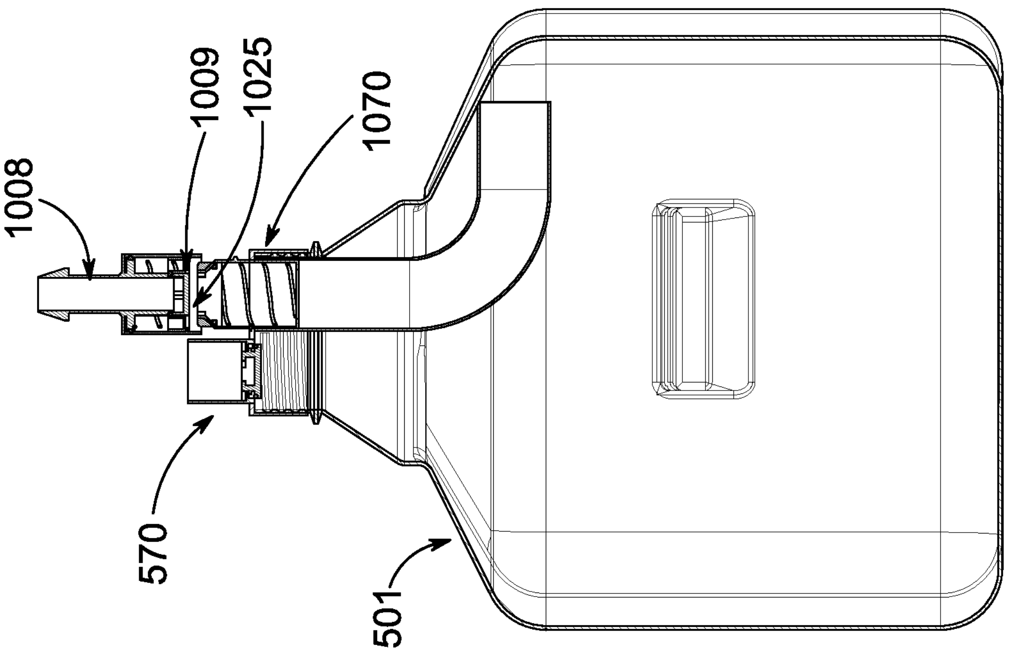

It is appreciated that in an embodiment, the second port 1070 forms a fluid connection with the fluid container when the insert is forced in a downward direction so that the fluid communication channel is directly formed with the fluid container. In another embodiment, as seen in FIGS. 11A, 11B, the second port 1070 includes a pipe having an angled design, for example, a J-tube design, so that the fluid is directed to a side of the fluid container. The J-tube can be press-fitted to the port or mechanically attached, e.g., screws, bolts, or the like. The angled pipe design avoids foaming of the fluid when filling by directing the fluid to the side of the fluid container so that the fluid cascades down the side of the fluid container. FIGS. 11A, 11B further show that the ports 570, 1070 can have different designs such that main body 505 of the fluid dispenser 514 can include the baffle design that connects to a first port 570 and the secondary body 1008 of the fluid dispenser 514 connects to the second port 1070 for the transfer of fluid into the fluid container 501. It is appreciated that the ports of the cap can have the same or different designs depending on the application and is not limited to the above discussed designs.

In another embodiment, a method for aseptically transferring a fluid into and from a fluid container is provided for freeze/thaw applications. Referring to FIGS. 5A and 5B, the method includes the steps of connecting a cap 512 to an opening of the fluid container. The cap 512 includes a housing 540, a cavity 545 within the housing 540, ports 570 connected to the cavity 545, and a set of seals 555. The ports 570 each include a port shell 571 and an insert 525 connected to one end of the port shell 571, in which the insert 525 is configured to open and close a fluid communication channel between the fluid container and the ports 570. The method further includes transferring fluid into the fluid container by aseptically connecting and disconnecting a fluid dispenser 514 to an outer surface of the port shell 571. The fluid dispenser 514 can include a main body 505 having a first end and a second end, a secondary body 508 having a first end and a second end, and fluid lines 510 connected to the main body 505, a shell housing 515 provided around the main body 505, a second set of seals, a secondary shell housing 509 provided around the secondary body 508, and an engagement piece 507 on the main body 505 and the secondary body 508 that is engageable with the insert 525, in which when the engagement piece 507 is engaged with the insert 525 of the port 570 by a rotational engagement, the fluid line 510 is able to be directed downwardly with the insert 525 towards the fluid container to open the fluid communication channel with the fluid container such that fluid is able to be transferred, e.g., filled or removed, from the fluid container. After the transfer of the fluid with the fluid container is completed, the insert 525 can be directed upwardly towards the port 570 such that the insert 525 can be rotated to engage and seal the port 570. The insertion of the insert 525 into the cavity 545 and the port 570 seals the fluid container by having the insert 525 and the seal 555 seal the port 570.

The fluid container can then be stored, transported, and used during the manufacturing process. For example, in an embodiment, the fluid container can be frozen such that the transferred fluid in the fluid container is frozen to about −85° C. Then, the fluid container can be transported and the transferred fluid can be thawed at a temperature between about 1° C. and 10° C. to allow flowability of the fluid. The fluid dispenser 514 can then be used to aseptically connect and disconnect to the fluid container. For example, in an embodiment, the main body 505 of the fluid dispenser 14 can be rotated in the shell housing and the shell housing 515 can be compressed so that the fluid line 510 is aseptically inserted into the fluid container. When the secondary body 508 is attached to the cap 512, a vacuum system (or positive pressure) can be used to remove the fluid from the fluid container through the fluid line of the main body 508.

Aspects:

Any of aspects 1-11 can be combined with any of aspects 12-17 and/or 18-19 and/or 20 and vice versa.

Aspect 1. An aseptic closure assembly for a fluid container, comprising: a cap connectable to an opening of the fluid container, the cap comprising a housing, a cavity within the housing having a support, and a first set of seals; and a fluid dispenser connectable to an outer surface of the housing of the cap, wherein the fluid dispenser comprises a main body having a first end and a second end and fluid lines provided within the main body between the first end and the second end, a shell housing provided around the main body, a second set of seals, and an insert connectable to the second end of the main body, wherein the main body includes apertures nearer the second end that are connected to the fluid lines and configured to be in fluid communication with the fluid container when the fluid dispenser is connected to the cap, and wherein the fluid dispenser is configured such that a downward directed force towards the fluid container fits the insert into the support of the cavity and disconnects the insert from the main body of the fluid dispenser to seal the fluid container.

Aspect 2. The aseptic closure assembly of Aspect 1, wherein the fluid container is a bottle.

Aspect 3. The aseptic closure assembly of any of Aspects 1-2, wherein the shell housing comprises an expanded portion that is in fluid communication with the apertures so that when a fluid is supplied or removed through the fluid lines of the fluid dispenser, the fluid flows from the apertures through the expanded portion and around the insert into the fluid container or from the fluid container around the insert through the expanded portion and then through the apertures.

Aspect 4. The aseptic closure assembly of any of Aspects 1-3, wherein the insert is disconnected from the main body by a press-fit fitting into the cavity and the support and/or connected by a rotation of the fluid dispenser while the insert is fitted into the support of the cavity.

Aspect 5. The aseptic closure assembly of Aspect 4, wherein the first set of seals comprises a first seal around the outer surface of the cap that is connectable to an inner surface of the shell housing and a second seal around the cavity.

Aspect 6. The aseptic closure assembly of any of Aspects 1-5, wherein the second set of seals comprises a third seal provided on the main body above the apertures and a fourth seal provided below the apertures along a length direction of the main body, wherein the third seal and the fourth seal engage the shell housing when the apertures are positioned above the expanded portion.

Aspect 7. The aseptic closure assembly of any of Aspects 1-6, wherein the shell housing comprises a plurality of first retaining features extending from one end of the shell housing that are configured to engage second retaining features provided on the outer surface of the housing of the cap, wherein the first retaining feature and the second retaining feature having complementary shapes.

Aspect 8. The aseptic closure assembly of any of Aspects 1-7, wherein the first set of seals and the second set of seals comprise one or more of silicone and ethylene-vinyl acetate (EVA).

Aspect 9. The aseptic closure assembly of any of Aspects 1-8, wherein at least one of the cap or the insert comprises a fluoropolymer.

Aspect 10. The aseptic closure assembly of any of Aspects 1-8, wherein the cap is connected to the fluid container using a tamper evident connector.

Aspect 11. The aseptic closure assembly of Aspect 4, wherein the fluid dispenser comprises engagement pieces for engaging the insert or an engagement member such that the fluid dispenser is able to engage the insert by the rotation of the fluid dispenser to remove the insert from the support of the cavity.

Aspect 12. The aseptic closure assembly according of any of Aspects 1-11, wherein the shell housing comprises a plurality of arms extending from one end of the shell housing that are configured to engage a corresponding plurality of slots provided on the outer surface of the housing of the cap, wherein the plurality of arms and the plurality of slots have complementary shapes for engaging and disengaging the same.

Aspect 13. The aseptic closure assembly according of any of Aspects 1-11, further comprising means for engaging and disengaging the fluid dispenser to the cap.

Aspect 14. An aseptic closure assembly for a fluid container, comprising: a cap connectable to an opening of the fluid container, the cap comprising a housing, a cavity within the housing, a port connected to the cavity, and a first set of seals, wherein the port comprises a port shell and an insert connected to one end of the port shell, wherein the insert is configured to open and close a fluid communication channel between the fluid container and the port; and a fluid dispenser connectable to an outer surface of the port shell, wherein the fluid dispenser comprises a main body having a first end and a second end and a fluid line provided within the main body between the first end and the second end, a shell housing provided around the main body, a second set of seals, and an engagement piece that is engageable with the insert, wherein the engagement piece of the fluid dispenser is engageable with the insert of the port by a rotational engagement such that the fluid line is able to be directed downwardly with the insert towards the fluid container to open the fluid communication channel with the fluid container.

Aspect 15. The aseptic closure assembly for a fluid container of Aspect 14, wherein the cap comprises a second cavity and a second port connected to the second cavity, wherein the second port comprises a second shell, a second insert provided to seal one end of the second port, and a first spring that biases the second insert in a closed position.

Aspect 16. The aseptic closure assembly for a fluid container of Aspect 15, further comprising a secondary body of the fluid dispenser having a second shell housing, a second spring that biases the secondary body in the second shell housing, and a third set of seals, wherein the second shell housing is configured to engage an outer surface of the second port so that the connection of the second shell housing to the second port causes the secondary body to bias the insert towards the fluid container to provide a second fluid communication channel between the secondary body and the fluid container.

Aspect 17. The aseptic closure assembly for a fluid container of Aspect 16, wherein the second port further comprises a pipe connected to the second port configured to direct fluid to a side of the fluid container.

Aspect 18. The aseptic closure assembly for a fluid container of Aspect 17, wherein the secondary body includes a tube connector selected from the group consisting of a hose barb, an overmolded connection, a screw connection, a press-fit connection, a snap-fit connection, or a combination thereof.

Aspect 19. The aseptic closure assembly for a fluid container of any of Aspects 14-18, wherein the shell housing comprises bellows that are compressible to allow the fluid line to be aseptically inserted into the fluid container.

Aspect 20. A method for aseptically transferring a fluid into and from a fluid container comprising the steps of: connecting a cap to an opening of the fluid container, the cap comprising a housing, a cavity within the housing, a port connected to the cavity, and a first set of seals, wherein the port comprises a port shell and an insert connected to one end of the port shell, wherein the insert is configured to open and close a fluid communication channel between the fluid container and the port; transferring fluid into the fluid container by aseptically connecting and disconnecting a fluid dispenser to an outer surface of the port shell, wherein the fluid dispenser comprises a main body having a first end and a second end and a fluid line provided within the main body between the first end and the second end, a shell housing provided around the main body, a second set of seals, and an engagement piece that is engageable with the insert, wherein when the engagement piece of the fluid dispenser is engaged with the insert of the port by a rotational engagement, the fluid line is able to be directed downwardly with the insert towards the fluid container to open the fluid communication channel with the fluid container.

Aspect 21. The method of Aspect 20, further comprising the steps of freezing the transferred fluid in the fluid container to about −85° C.; thawing the transferred fluid at a temperature between about 1° C. and 10° C. to allow flowability of the fluid; aseptically connecting and disconnecting the fluid dispenser to the fluid container; rotating the fluid line in the shell housing of the fluid dispenser and compressing the fluid dispenser so that the fluid line is aseptically inserted into the fluid container; and removing the fluid from the fluid container through the fluid line.

Aspect 22. A fluid dispenser connectable to an outer surface of a cap of a fluid container, comprising: a main body having a first end and a second end, wherein the main body includes a fluid line provided between the first end and the second end; and a shell housing provided around the main body, wherein the fluid line at the second end of the main body is configured to be connectable with an insert provided in the cap by a rotation of the main body, and wherein the shell housing comprises bellows that are compressible to allow the fluid line to be aseptically inserted into the fluid container.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An aseptic closure assembly for a fluid container, comprising:

a cap connectable to an opening of the fluid container, the cap comprising a housing, a cavity within the housing having a support, and a first set of seals; and a fluid dispenser connectable to an outer surface of the housing of the cap, wherein the fluid dispenser comprises a main body having a first end and a second end and fluid lines provided within the main body between the first end and the second end, a shell housing provided around the main body, a second set of seals, and an insert connectable to the second end of the main body, wherein the main body includes apertures nearer the second end that are connected to the fluid lines and configured to be in fluid communication with the fluid container when the fluid dispenser is connected to the cap, and wherein the fluid dispenser is configured such that a downward directed force towards the fluid container fits the insert into the support of the cavity and disconnects the insert from the main body of the fluid dispenser to seal the fluid container.

2. The aseptic closure assembly according to claim 1, wherein the fluid container is a bottle.

3. The aseptic closure assembly according to claim 1, wherein the shell housing comprises an expanded portion that is in fluid communication with the apertures so that when a fluid is supplied or removed through the fluid lines of the fluid dispenser, the fluid flows from the apertures through the expanded portion and around the insert into the fluid container or from the fluid container around the insert through the expanded portion and then through the apertures.

4. The aseptic closure assembly according to claim 1, wherein the insert is disconnected from the main body by a press-fit fitting into the cavity and the support and/or connected by a rotation of the fluid dispenser while the insert is fitted into the support of the cavity.

5. The aseptic closure assembly according to claim 4, wherein the first set of seals comprises a first seal around the outer surface of the cap that is connectable to an inner surface of the shell housing and a second seal around the cavity.

6. The aseptic closure assembly according to claim 4, wherein the fluid dispenser comprises engagement pieces for engaging the insert or an engagement member such that the fluid dispenser is able to engage the insert by the rotation of the fluid dispenser to remove the insert from the support of the cavity.

7. The aseptic closure assembly according to claim 1, wherein the second set of seals comprises a third seal provided on the main body above the apertures and a fourth seal provided below the apertures along a length direction of the main body, wherein the third seal and the fourth seal engage the shell housing when the apertures are positioned above the expanded portion.

8. The aseptic closure assembly according to claim 1, wherein the shell housing comprises a plurality of first retaining features extending from one end of the shell housing that are configured to engage second retaining features provided on the outer surface of the housing of the cap, wherein the first retaining feature and the second retaining feature having complementary shapes.

9. The aseptic closure assembly according to claim 1, wherein the first set of seals and the second set of seals comprise one or more of silicone and ethylene-vinyl acetate (EVA).

10. The aseptic closure assembly according to claim 1, wherein at least one of the cap or the insert comprises a fluoropolymer.

11. The aseptic closure assembly according to claim 1, wherein the cap is connected to the fluid container using a tamper evident connector.

12. The aseptic closure assembly according to claim 1, wherein the shell housing comprises a plurality of arms extending from one end of the shell housing that are configured to engage a corresponding plurality of slots provided on the outer surface of the housing of the cap, wherein the plurality of arms and the plurality of slots have complementary shapes for engaging and disengaging the same.

13. The aseptic closure assembly according to claim 1, further comprising means for engaging and disengaging the fluid dispenser to the cap.

14. An aseptic closure assembly for a fluid container, comprising:

a cap connectable to an opening of the fluid container, the cap comprising a housing, a cavity within the housing, a port connected to the cavity, and a first set of seals, wherein the port comprises a port shell and an insert connected to one end of the port shell, wherein the insert is configured to open and close a fluid communication channel between the fluid container and the port; and a fluid dispenser connectable to an outer surface of the port shell, wherein the fluid dispenser comprises a main body having a first end and a second end and a fluid line provided within the main body between the first end and the second end, a shell housing provided around the main body, a second set of seals, and an engagement piece that is engageable with the insert, wherein the engagement piece of the fluid dispenser is engageable with the insert of the port by a rotational engagement such that the fluid line is able to be directed downwardly with the insert towards the fluid container to open the fluid communication channel with the fluid container.

15. The aseptic closure assembly for a fluid container according to claim 14, wherein the cap comprises a second cavity and a second port connected to the second cavity, wherein the second port comprises a second shell, a second insert provided to seal one end of the second port, and a first spring that biases the second insert in a closed position.

16. The aseptic closure assembly for a fluid container according to claim 15, further comprising a secondary body of the fluid dispenser having a second shell housing, a second spring that biases the secondary body in the second shell housing, and a third set of seals, wherein the second shell housing is configured to engage an outer surface of the second port so that the connection of the second shell housing to the second port causes the secondary body to bias the insert towards the fluid container to provide a second fluid communication channel between the secondary body and the fluid container.

17. The aseptic closure assembly for a fluid container according to claim 16, wherein the second port further comprises a pipe connected to the second port configured to direct fluid to a side of the fluid container.

18. The aseptic closure assembly for a fluid container according to claim 17, wherein the secondary body includes a tube connector selected from the group consisting of a hose barb, an overmolded connection, a screw connection, a press-fit connection, a snap-fit connection, or a combination thereof.

19. The aseptic closure assembly for a fluid container according to claim 14, wherein the shell housing comprises bellows that are compressible to allow the fluid line to be aseptically inserted into the fluid container.

20. A method for aseptically transferring a fluid into and from a fluid container comprising the steps of:

connecting a cap to an opening of the fluid container, the cap comprising a housing, a cavity within the housing, a port connected to the cavity, and a first set of seals, wherein the port comprises a port shell and an insert connected to one end of the port shell, wherein the insert is configured to open and close a fluid communication channel between the fluid container and the port;

transferring fluid into the fluid container by aseptically connecting and disconnecting a fluid dispenser to an outer surface of the port shell, wherein the fluid dispenser comprises a main body having a first end and a second end and a fluid line provided within the main body between the first end and the second end, a shell housing provided around the main body, a second set of seals, and an engagement piece that is engageable with the insert, wherein when the engagement piece of the fluid dispenser is engaged with the insert of the port by a rotational engagement, the fluid line is able to be directed downwardly with the insert towards the fluid container to open the fluid communication channel with the fluid container.

* * * * *